(12) United States Patent
Kitazaki et al.

(10) Patent No.: US 10,907,851 B2
(45) Date of Patent: Feb. 2, 2021

(54) AIR-CONDITIONING REMOTE CONTROLLER

(71) Applicant: Mitsubishi Electric Corporation, Tokyo (JP)

(72) Inventors: Mitsuru Kitazaki, Tokyo (JP); Hirotaka Masui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/318,168

(22) PCT Filed: Sep. 26, 2016

(86) PCT No.: PCT/JP2016/078249
§ 371 (c)(1),
(2) Date: Jan. 16, 2019

(87) PCT Pub. No.: WO2018/055759
PCT Pub. Date: Mar. 29, 2018

(65) Prior Publication Data
US 2019/0285306 A1    Sep. 19, 2019

(51) Int. Cl.
*G05B 15/02* (2006.01)
*F24F 11/58* (2018.01)
(Continued)

(52) U.S. Cl.
CPC .............. *F24F 11/58* (2018.01); *F24F 11/52* (2018.01); *F24F 11/523* (2018.01); *F24F 11/56* (2018.01);
(Continued)

(58) Field of Classification Search
CPC ......... F24F 11/58; F24F 11/523; F24F 11/64; F24F 11/56; F24F 11/52; F24F 2120/00;
(Continued)

(56) References Cited

U.S. PATENT DOCUMENTS 10,234,163 B1 *   3/2019  Bart ........................ F24D 19/10
2007/0278320 A1 * 12/2007  Lunacek ............ G05B 19/0423
                                                                236/94
(Continued)

FOREIGN PATENT DOCUMENTS

EP    1 811 241 A2    7/2007
EP      3062032 A1    8/2016
(Continued)

OTHER PUBLICATIONS

International Search Report of the International Searching Authority dated Nov. 8, 2016 for the corresponding international application No. PCT/JP2016/078249 (and English translation).

(Continued)

*Primary Examiner* — Thomas C Lee
*Assistant Examiner* — Gary Collins
(74) *Attorney, Agent, or Firm* — Posz Law Group, PLC

(57) ABSTRACT

An air-conditioning remote controller for operating an air-conditioning apparatus is provided. The air-conditioning remote controller includes a display unit, an image acquisition processing unit, and a display processing unit. The display unit displays various information. The image acquisition processing unit acquires image data from an external communication terminal. The display processing unit displays, on the display unit, a settings management screen used for operating the air-conditioning apparatus, and the image data acquired by the image acquisition processing unit from the communication terminal.

19 Claims, 20 Drawing Sheets

(51) Int. Cl.
  *F24F 11/523* (2018.01)
  *F24F 11/64* (2018.01)
  *F24F 11/63* (2018.01)
  *F24F 11/56* (2018.01)
  *F24F 11/52* (2018.01)
  *F24F 120/20* (2018.01)
  *F24F 120/00* (2018.01)

(52) U.S. Cl.
  CPC .............. *F24F 11/63* (2018.01); *F24F 11/64* (2018.01); *G05B 15/02* (2013.01); *F24F 2120/00* (2018.01); *F24F 2120/20* (2018.01); *G05B 2219/23121* (2013.01); *G05B 2219/2614* (2013.01)

(58) Field of Classification Search
  CPC ................. F24F 2120/20; G05B 15/02; G05B 2219/23121; G05B 2219/2614
  See application file for complete search history.

(56) References Cited

U.S. PATENT DOCUMENTS

| | | | | |
|---|---|---|---|---|
| 2011/0287528 | A1* | 11/2011 | Fern | A61B 5/72 435/287.1 |
| 2014/0058569 | A1 | 2/2014 | Kuroiwa | |
| 2014/0123183 | A1* | 5/2014 | Fujimoto | H04N 21/482 725/37 |
| 2015/0148969 | A1 | 5/2015 | Sasaki et al. | |
| 2016/0163052 | A1* | 6/2016 | Kim | G06F 3/0483 715/766 |

FOREIGN PATENT DOCUMENTS

| | | |
|---|---|---|
| JP | 2012-172910 A | 9/2012 |
| JP | 2014-105950 A | 6/2014 |
| JP | 2015-210062 A | 11/2015 |
| JP | 2016-125687 A | 7/2016 |
| WO | 2006/135167 A2 | 12/2006 |
| WO | 2014/128786 A1 | 8/2014 |

OTHER PUBLICATIONS

Extended European Search Report dated Aug. 19, 2019 issued in corresponding EP patent application No. 16916826.7.
Office Action dated Jan. 7, 2020 issued in corresponding JP patent application No. 2018-540588 (and English translation).
Office Action dated Jul. 13, 2020 issued in corresponding CN patent application No. 201680089466.0 (and English translation).

* cited by examiner

FIG. 9

| SETTINGS MANAGEMENT SCREEN ETC. | IMAGE DATA | IMAGE SETTINGS (PLACEMENT SETTINGS) |
|---|---|---|
| (STANDBY MODE) | G3 | FULL |
| | G5 | PARTIAL (LOWER RIGHT) |
| A | G3 | FULL |
| B | G1 | PARTIAL (LOWER CENTER) |
| | G2 | FULL |
| C | G4 | FULL |

FIG. 10
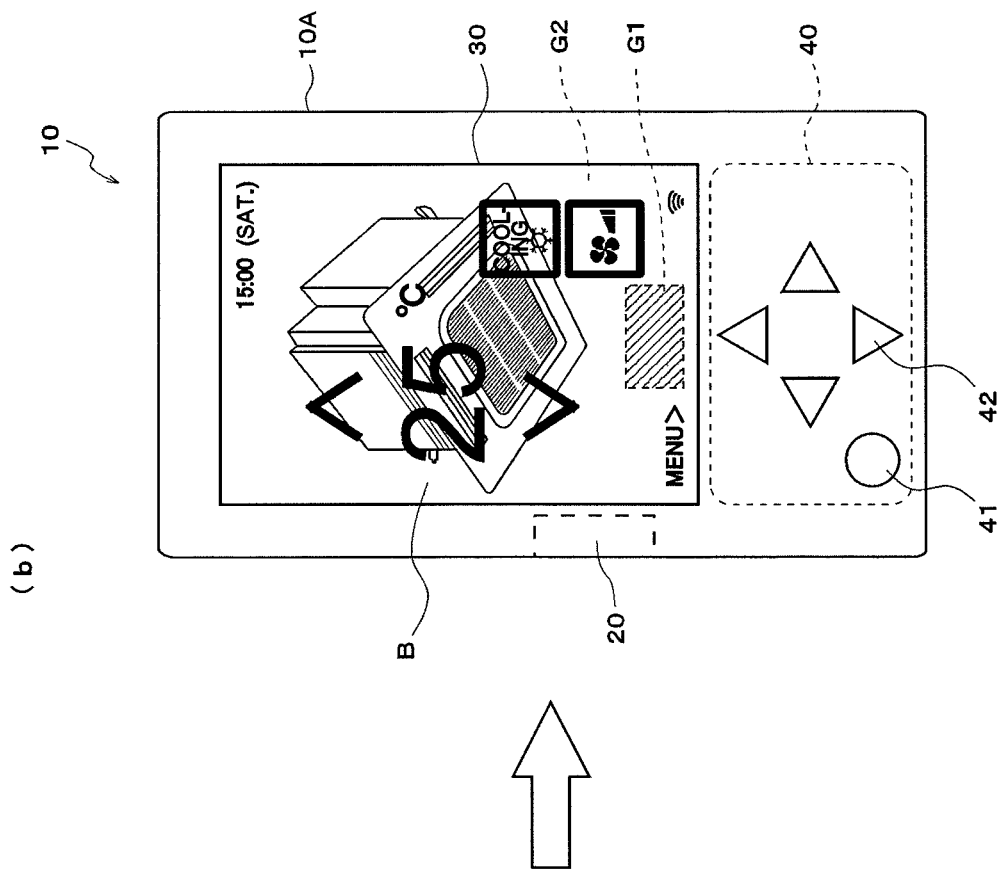
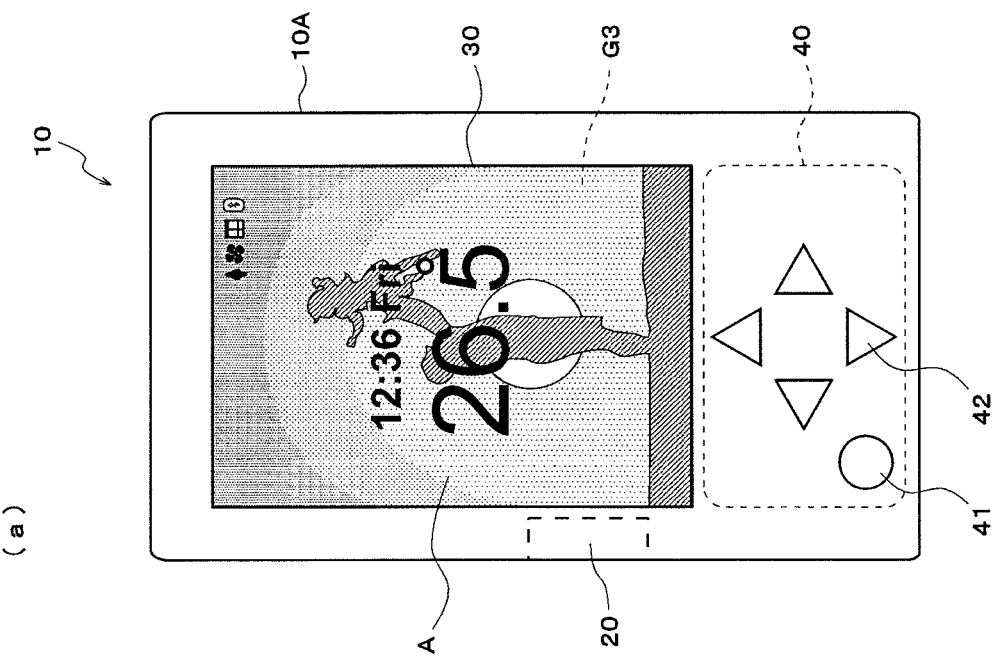

FIG. 14

| SETTINGS MANAGEMENT SCREEN | IMAGE DATA (STANDARD IMAGE INFORMATION) | REPLACEMENT IMAGE DATA |
|---|---|---|
| (STANDBY MODE) | G2、G3、G4 | |
| A | G2 | G3 |
| B | G1 | G4 |
| C | G4、G5 | |

AIR-CONDITIONING REMOTE CONTROLLER

CROSS REFERENCE TO RELATED APPLICATION

This application is a U.S. national stage application of International Application No. PCT/JP2016/078249, filed on Sep. 26, 2016, the contents of which are incorporated herein by reference.

TECHNICAL FIELD

The present invention relates to an air-conditioning remote controller configured to operate an air-conditioning apparatus.

BACKGROUND

Conventional air-conditioning remote controllers have a display unit that uses, for example, a liquid crystal display (see, for example, Patent Literature 1). Recent years have encountered widespread use of air-conditioning remote controllers with a display unit that uses a full-dot liquid crystal display.

An air-conditioning remote controller described in Patent Literature 1 is able to display a schedule settings screen made up of a large number of characters including Chinese characters. As described above, conventional air-conditioning remote controllers use combinations of small dots to display simple images, such as numbers, characters, or operating icons, on the display unit.

PATENT LITERATURE

Patent Literature 1: Japanese Unexamined Patent Application Publication No. 2014-105950

However, conventional air-conditioning remote controllers are configured to display a fixed set of information such as the operational state of an air-conditioning apparatus, and do not have a function of displaying information not related to operations on the air-conditioning apparatus. Due to the improving display performance of the display units of air-conditioning remote controllers, it is desirable to use the display units for other uses.

SUMMARY

The present invention has been made to address the above-mentioned problem, and accordingly, it is an object of the present invention to provide an air-conditioning remote controller that displays, on the display unit, image data according to the user's usage condition.

According to an embodiment of the present invention, there is provided an air-conditioning remote controller configured to operate an air-conditioning apparatus, the air-conditioning remote controller including a display unit configured to display various information, an image acquisition processing unit configured to acquire image data from an external communication terminal, and a display processing unit to display, on the display unit, a settings management screen configured to operate the air-conditioning apparatus, and the image data acquired by the image acquisition processing unit from the communication terminal.

According to an embodiment of the present invention, image data acquired from an external communication terminal is displayed on the display unit. Consequently, in addition to information related to operations on the air-conditioning apparatus, information not related to operations on the air-conditioning apparatus can be displayed on the display unit, thus making it possible to use the display unit for other users.

BRIEF DESCRIPTION OF DRAWINGS

FIG. 9 is a table illustrating an exemplary display switching table created and changed by the image settings processing unit illustrated in FIG. 4.

FIG. 10 illustrates an exemplary image data switching process performed in response to a change in a settings management screen on the display unit illustrated in FIG. 10.

FIG. 14 illustrates an exemplary display switching table created and changed by a control unit of an air-conditioning remote controller according to Embodiment 2 of the present invention.

DETAILED DESCRIPTION

Embodiment 1

Figure 1:
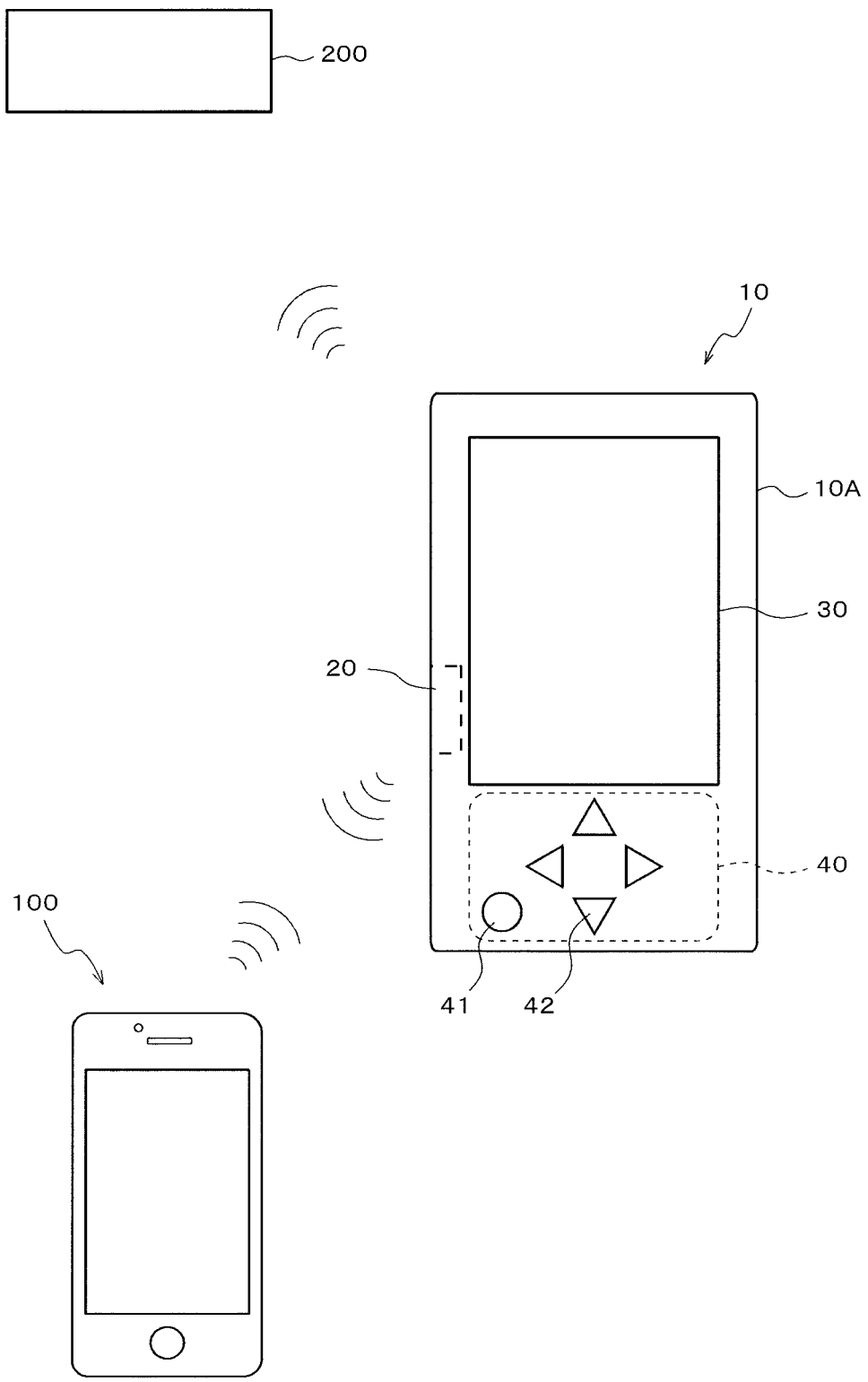
FIG. 1 schematically illustrates an air-conditioning remote controller according to Embodiment 1 of the present invention, and a communication terminal that provides an image to the air-conditioning remote controller.

FIG. 1 schematically illustrates an air-conditioning remote controller according to Embodiment 1 of the present invention, and a communication terminal that provides an image to the air-conditioning remote controller. An air-conditioning remote controller 10 is used for operating an air-conditioning apparatus 200.

A communication terminal 100 is a communication terminal such as a cellular phone, a smart phone, a tablet PC, or a notebook PC, or a stationary communication terminal such as a desktop PC. FIG. 1 illustrates a case in which the communication terminal 100 is a smart phone. The communication terminal 100 has a function of performing wireless communication via a wireless LAN such as Bluetooth (registered trademark: the same applies hereinafter) or a Wi-Fi (registered trademark: the same applies hereinafter), or a given communication standard such as infrared communication.

The air-conditioning apparatus 200 is disposed in an air-conditioned space such as a room to adjust the temperature, humidity, cleanliness, and other conditions of the air-conditioned space. The air-conditioning apparatus 200 may be a split air-conditioning apparatus with the indoor unit and the outdoor unit being installed separately, or may be an integrated air-conditioning apparatus that combines the functions of the indoor and outdoor units. Other possible examples of the air-conditioning apparatus 200 may include a ventilator used to replace the air in the air-conditioned space with outside air, an air cleaner used to remove dust floating in the air, and a humidifier used to humidify the air in the air-conditioned space.

The air-conditioning remote controller 10 is a remote controller for air-conditioning operation, which is connected to the air-conditioning apparatus 200 in a wired or wireless manner and used for operating the air-conditioning apparatus 200. The air-conditioning remote controller 10 is placed, for example, on the wall of a room. The air-conditioning remote controller 10 has a function of acquiring image data transmitted from the communication terminal 100 and displays the acquired image data.

As illustrated in FIG. 1, the air-conditioning remote controller 10 includes a housing 10A, a wireless interface 20, a display unit 30, and an operating unit 40. The wireless interface 20 is an interface used for the air-conditioning remote controller 10 to perform wireless communication with the communication terminal 100 and the air-conditioning apparatus 200. The wireless interface 20 performs wireless communication via a wireless LAN such as Bluetooth or Wi-Fi, or a given communication standard such as infrared communication. The display unit 30 is, for example, a liquid crystal display (LCD), and displays various information.

The operating unit 40 has, for example, an ON/OFF key 41, and a plurality of operating keys 42. The operating unit 40 receives various input operations made via the ON/OFF key 41 and the operating keys 42. The operating unit 40 has a function of receiving an input operation related to operational control for the air-conditioning apparatus 200. The operating unit 40 has a function of receiving a display setting operation for image data G that is to be displayed on the display unit 30.

The ON/OFF key 41 is a key switch depressed by the user when starting or stopping operation of the air-conditioning apparatus 200. The operating keys 42 include a key switch to which various functions are assigned in accordance with the screen being displayed on the display unit 30. The operating keys 42 may include a key switch to which a specific function is statically assigned.

Figure 2:
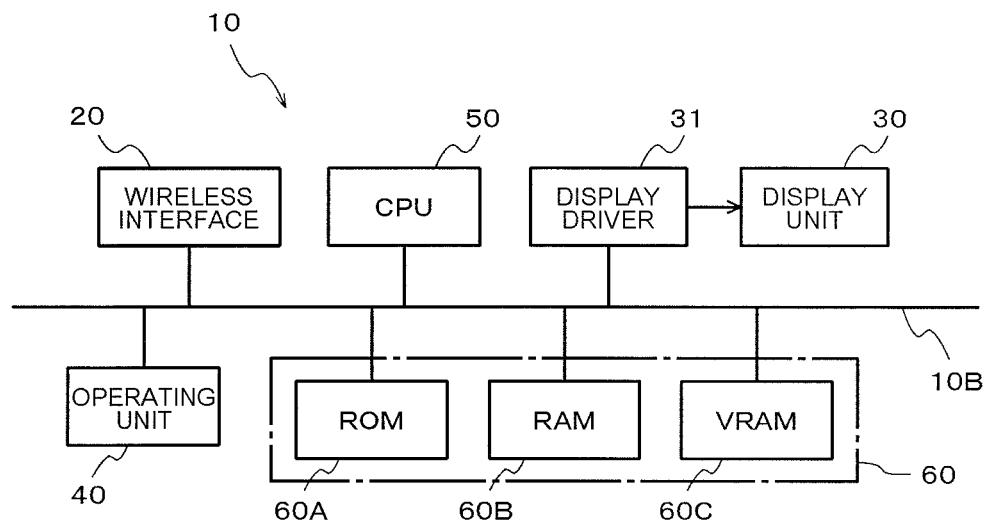
FIG. 2 is a block diagram illustrating the hardware configuration of the air-conditioning remote controller illustrated in FIG. 1.

FIG. 2 is a block diagram illustrating the hardware configuration of the air-conditioning remote controller 10 illustrated in FIG. 1. As illustrated in FIG. 2, the air-conditioning remote controller 10 includes the wireless interface 20, the display unit 30, a display driver 31, the operating unit 40, a central processing unit (CPU) 50, and a memory unit 60. The wireless interface 20, the display unit 30, the display driver 31, the operating unit 40, the CPU 50, and the memory unit 60 are connected by a bus 10B.

The memory unit 60 includes a read only memory (ROM) 60A, a random access memory (RAM) 60B, and a video RAM (VRAM) 60C. The ROM 60A is a non-volatile memory. For example, an operation program for the CPU 50 is stored in the ROM 60A. The RAM 60B is a volatile memory in which a program or data is temporarily stored. The VRAM 60C is a memory device dedicated to image display.

The CPU 50 executes software of the air-conditioning remote controller 10. That is, the CPU 50 reads an operation program from the ROM 60A and executes the operation program to thereby implement, in cooperation with the display driver 31, various functions of a control unit 50A that will be described later. More specifically, the CPU 50 acquires image data G from the communication terminal 100 via the wireless interface 20. The CPU 50 also stores the acquired image data into the ROM 60A in the memory unit 60. Further, in response to, for example, a user operation on the operating key 42, the CPU 50 reads image data G from the ROM 60A, loads the image data G to the RAM 60B, and then stores the image data G into the VRAM 60C. The display driver 31 is, for example, an LCD driver, and causes image data G stored in the VRAM 60C to be displayed on the display unit 30.

Figure 3:
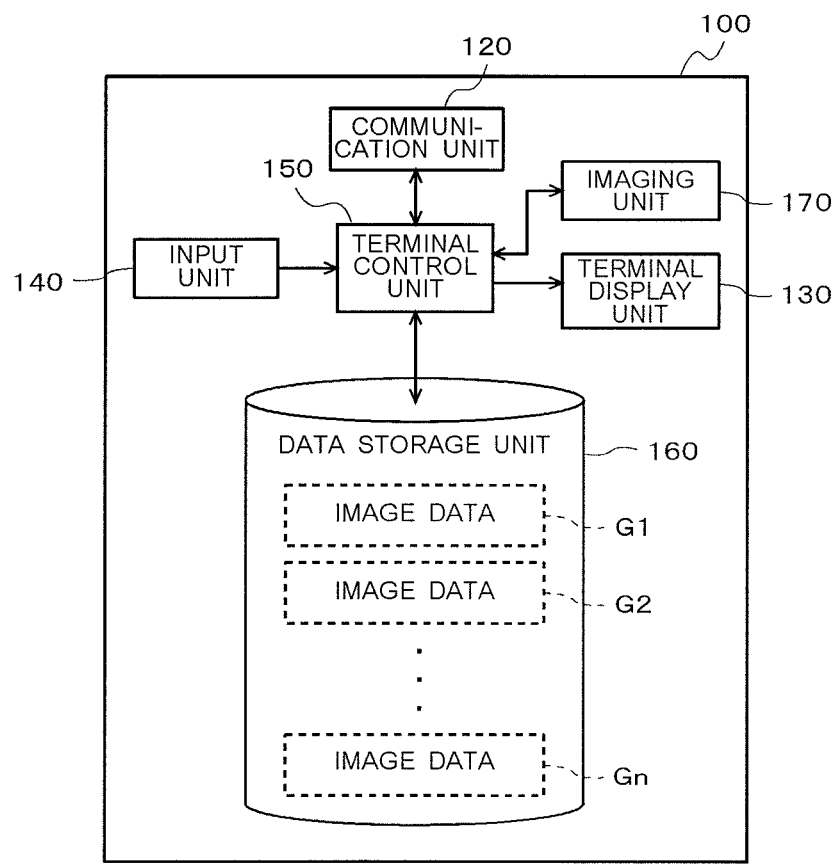
FIG. 3 is a block diagram illustrating the functional configuration of the communication terminal illustrated in FIG. 1.

FIG. 3 is a block diagram illustrating the functional configuration of the communication terminal 100 illustrated in FIG. 1. The communication terminal 100 includes a communication unit 120, a terminal display unit 130, an input unit 140, a terminal control unit 150, a data storage unit 160, and an imaging unit 170.

The communication unit 120 has a function of performing wireless communication in accordance with a given communication standard. The terminal display unit 130 is, for example, a liquid crystal display or touch panel, and displays various information. If the terminal display unit 130 is a touch panel, the terminal display unit 130 outputs a signal corresponding to a touch operation to the terminal control unit 150. The input unit 140 is a pointing device such as a keyboard or a mouse, and outputs a signal indicative of an external input operation to the terminal control unit 150. The terminal control unit 150 executes various processes, such as transmission of image data G, in accordance with a signal transmitted from the input unit 140 or from the terminal display unit 130 that is a touch panel.

Examples of the data storage unit 160 include a RAM and a ROM. One or more pieces of image data G are stored in the data storage unit 160 in advance. FIG. 3 illustrates a case in which the data storage unit 160 stores a plurality of pieces of image data G1 to Gn. Examples of image data stored in the data storage unit 160 include image data already stored in the communication terminal 100 at the time of initial settings, image data acquired by the communication terminal 100 via the Internet, and image data captured by the imaging unit 170.

The imaging unit 170 includes a camera (not illustrated) with an imaging device such as a charge coupled device (CCD) or a complementary metal oxide semiconductor (CMOS) device. The imaging unit 170 captures images of various subjects.

Figure 4:
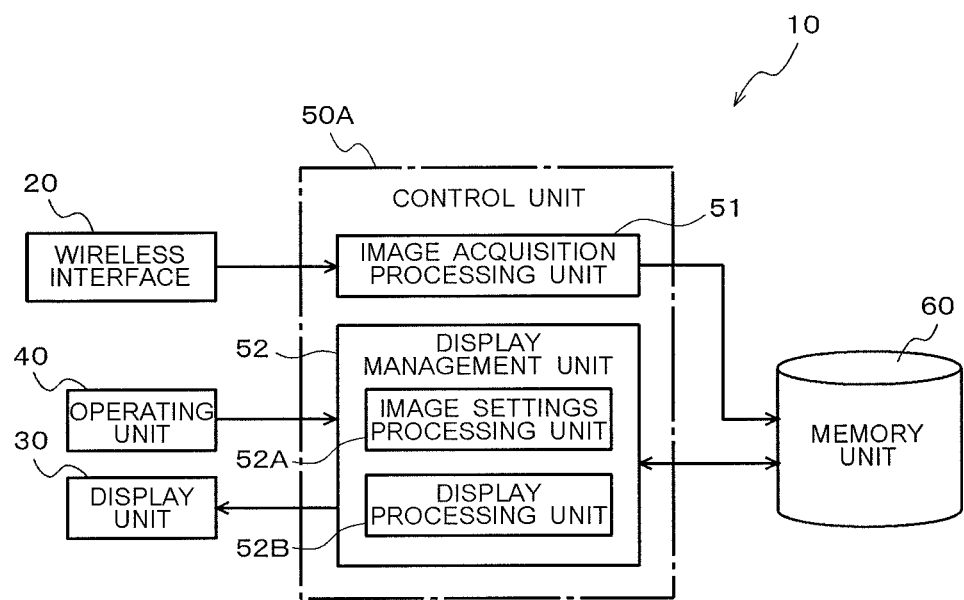
FIG. 4 is a block diagram illustrating the functional configuration of the air-conditioning remote controller illustrated in FIG. 1.

FIG. 4 is a block diagram illustrating the functional configuration of the air-conditioning remote controller 10 illustrated in FIG. 1. As illustrated in FIG. 4, the air-conditioning remote controller 10 includes the wireless interface 20, the display unit 30, the operating unit 40, the control unit 50A, and the memory unit 60.

When the wireless interface 20 establishes wireless connection with the communication terminal 100, the air-conditioning remote controller 10 becomes able to receive image data G from the communication terminal 100. The operating unit 40 receives an input operation made by the user, and outputs an operation signal corresponding to the operation to the control unit 50A. For example, when the user instructs using the operating key 42 that image data be displayed, the operating unit 40 outputs, to the control unit 50A, an operation signal instructing that image data be displayed.

One or more pieces of image data G transmitted from the communication terminal 100 are stored in the memory unit 60. In this regard, since information of images to be displayed on the display unit 30 may be also stored in the memory unit 60 in advance, the term "image data G" as used hereinafter also includes information of images pre-stored in the memory unit 60. Information of a selection/settings screen for performing selection of and settings for image data G is also stored in the memory unit 60. Further, the memory unit 60 also stores information of a plurality of settings management screens related to the settings for and management of the air-conditioning apparatus 200. The settings management screens include screens such as a normal display screen that displays information such as the current time or temperature, and an operational screen related to operations on the air-conditioning apparatus 200. Alternatively, however, the memory unit 60 may store information of a single settings management screen.

The control unit 50A includes an image acquisition processing unit 51, and a display management unit 52. The image acquisition processing unit 51 acquires image data G from the communication terminal 100 via the wireless interface 20. The image acquisition processing unit 51 stores the acquired image data G into the ROM 60A in the memory unit 60. After acquiring the image data G from the communication terminal 100, the image acquisition processing unit 51 outputs, to the display management unit 52, an acquisition signal indicating that the image data G has been acquired.

The display management unit 52 manages image data G acquired by the image acquisition processing unit 51 from the communication terminal 100, and displays the image data G on the display unit 30 in response to an operation signal from the operating unit 40. The display management unit 52 includes an image settings processing unit 52A, and a display processing unit 52B.

The image settings processing unit 52A receives, via the operating unit 40, a display setting operation for image data G made by the user. Examples of display setting operations include an operation to set the placement, size, or other features of image data G to be displayed on the screen of the display unit 30. If the memory unit 60 stores a plurality of pieces of image data G, then examples of display setting operations include a user operation to select a piece of image data G.

More specifically, in response to an operation signal from the operating unit 40 that is based on a user's operation, the image settings processing unit 52A displays the selection/settings screen on the display unit 30 in cooperation with the display processing unit 52B. The image settings processing unit 52A performs display settings for one or more pieces of image data G in response to a display setting operation made by the user on the selection/settings screen. Further, the image settings processing unit 52A stores settings information indicative of the display settings into the memory unit 60.

The image settings processing unit 52A performs one of the following settings as a display setting: a setting that displays image data G on the entire screen of the display unit 30; and a setting that displays image data G on a portion of the screen of the display unit 30. The image settings processing unit 52A may have a function of making, as a display setting, a multi-image display setting that simultaneously displays a plurality of pieces of image data G. In this case, the image settings processing unit 52A executes one of the following settings as the multi-image display setting: a setting that displays image data G at each of two or more positions on the screen of the display unit 30; and a setting that, in a manner superimposed over a piece of image data G to be displayed on the entire screen of the display unit 30, displays another piece of image data G or other pieces of image data G on a portion of the display unit 30.

In the case of the setting that displays image data G on a portion of the screen of the display unit 30, the image settings processing unit 52A may have a placement setting function to receive, on the selection/settings screen, placement settings for the image data G. The placement settings may desirably include height position settings, such as top, center, or bottom on the screen of the display unit 30, and lateral position settings such as left, center, and right on the screen of the display unit 30. Alternatively, however, placement settings may be made by further subdividing the screen of the display unit 30.

The image settings processing unit 52A may have a function of associating individual pieces of image data G with individual settings management screens in response to an operation signal provided from the operating unit 40. For example, the user may be able to associate individual pieces of image data G with individual settings management screens on the selection/settings screen, and the image settings processing unit 52A may create a display switching table associating the individual pieces of image data G with the individual settings management screens. Then, the image settings processing unit 52A may desirably store the created display switching table into the memory unit 60 as settings information.

The air-conditioning remote controller 10 may, upon elapse of a set time after the last user operation or in response to a user's operation, hide the current settings management screen and transition to a standby mode. In this regard, the display management unit 52 may have an air-conditioning management mode that displays a settings management screen on the display unit 30, and a standby mode that hides a settings management screen in accordance with a setting or a user operation. In this case, the user may be able to associate image data G with the standby mode, and the image settings processing unit 52A may, in response to an operation signal from the operating unit 40, perform a setting that associates the standby mode with image data G. For example, the image settings processing unit 52A may create, by means of a table creation function, a display switching table by associating individual pieces of image data G with individual settings management screens and with the standby mode.

The display processing unit 52B displays the following pieces of information on the display unit 30 in accordance with the display settings made by the image settings processing unit 52A: a settings management screen for operating the air-conditioning apparatus 200; and image data G stored in the memory unit 60. The memory unit 60 stores image data G acquired by the image acquisition processing unit 51 from the communication terminal 100.

The display processing unit 52B has a function of displaying image data G on the entire screen of the display unit 30. That is, the display processing unit 52B has a function of displaying image data G on the entire screen of the display unit 30, either as the background of a settings management screen or as a display image displayed during the standby mode. The display processing unit 52B also has a function of displaying image data G on a portion of the screen of the display unit 30.

The display processing unit 52B may have a function of displaying a plurality of pieces of image data G, each at a predetermined position on the screen of the display unit 30. The display processing unit 52B may also have a function of, in a manner superimposed over a piece of image data G to be displayed on the entire screen of the display unit 30, displaying another piece of image data G on a portion of the screen of the display unit. Further, the display processing unit 52B may have a function of, in a manner superimposed over a piece of image data G to be displayed on the entire screen of the display unit 30, displaying a plurality of other pieces of image data G at predetermined positions on the screen of the display unit 30.

Further, the display processing unit 52B may have a function to switch between the air-conditioning management mode and the standby mode. More specifically, the display processing unit 52B may, upon elapse of a set time after the last user operation or in response to an instruction given from the user via the operating unit 40, hide the current settings management screen and change to the standby mode. The set time can be set and changed to any given time. If the standby mode is associated with image data G in the memory unit 60, the display processing unit 52B may, when switching to the standby mode, display the image data G associated with the standby mode on the display unit 30.

Figure 5:
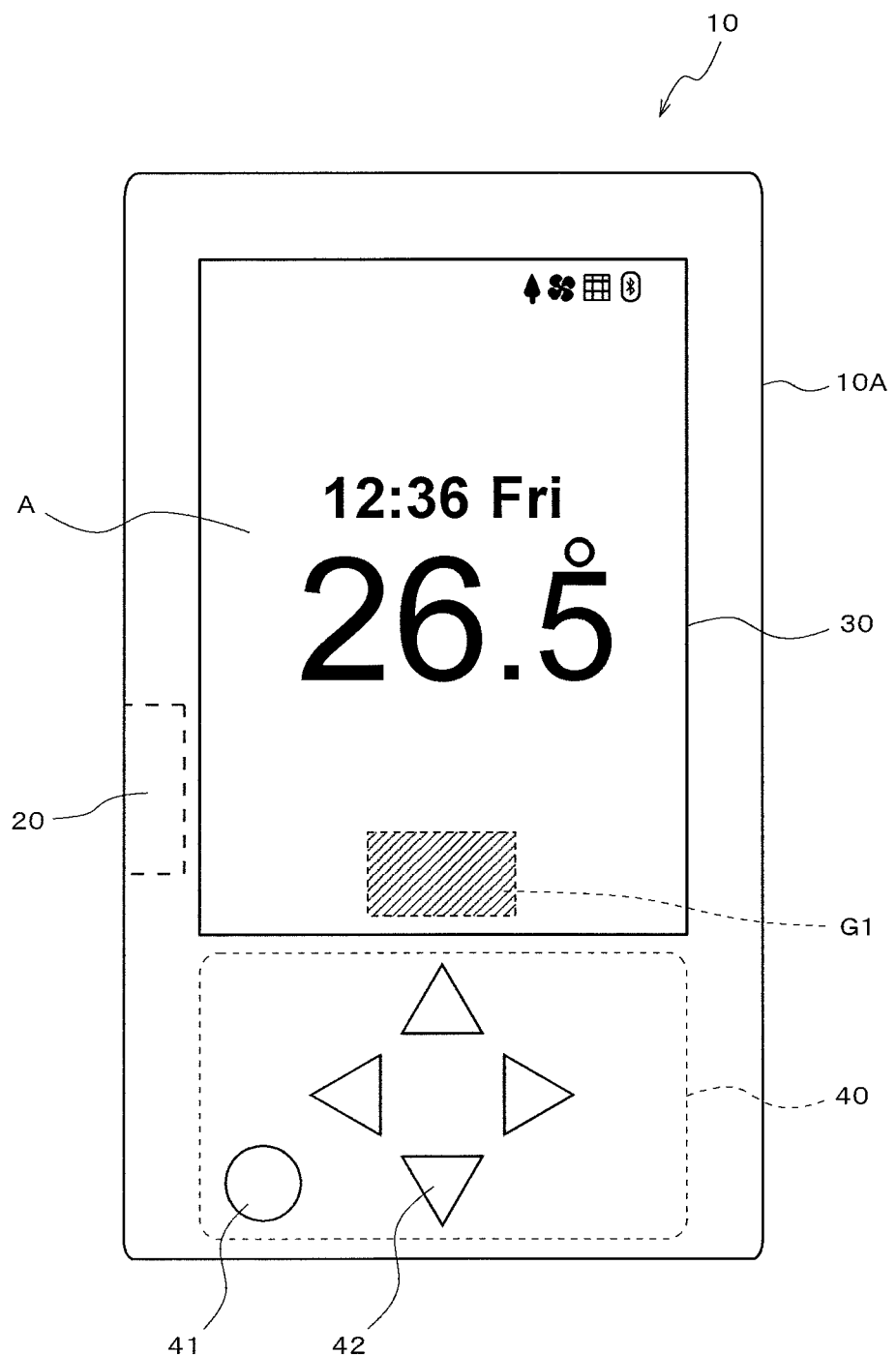
FIG. 5 illustrates a state in which image data is displayed on the display unit of the air-conditioning remote controller illustrated in FIG. 1.
Figure 6:
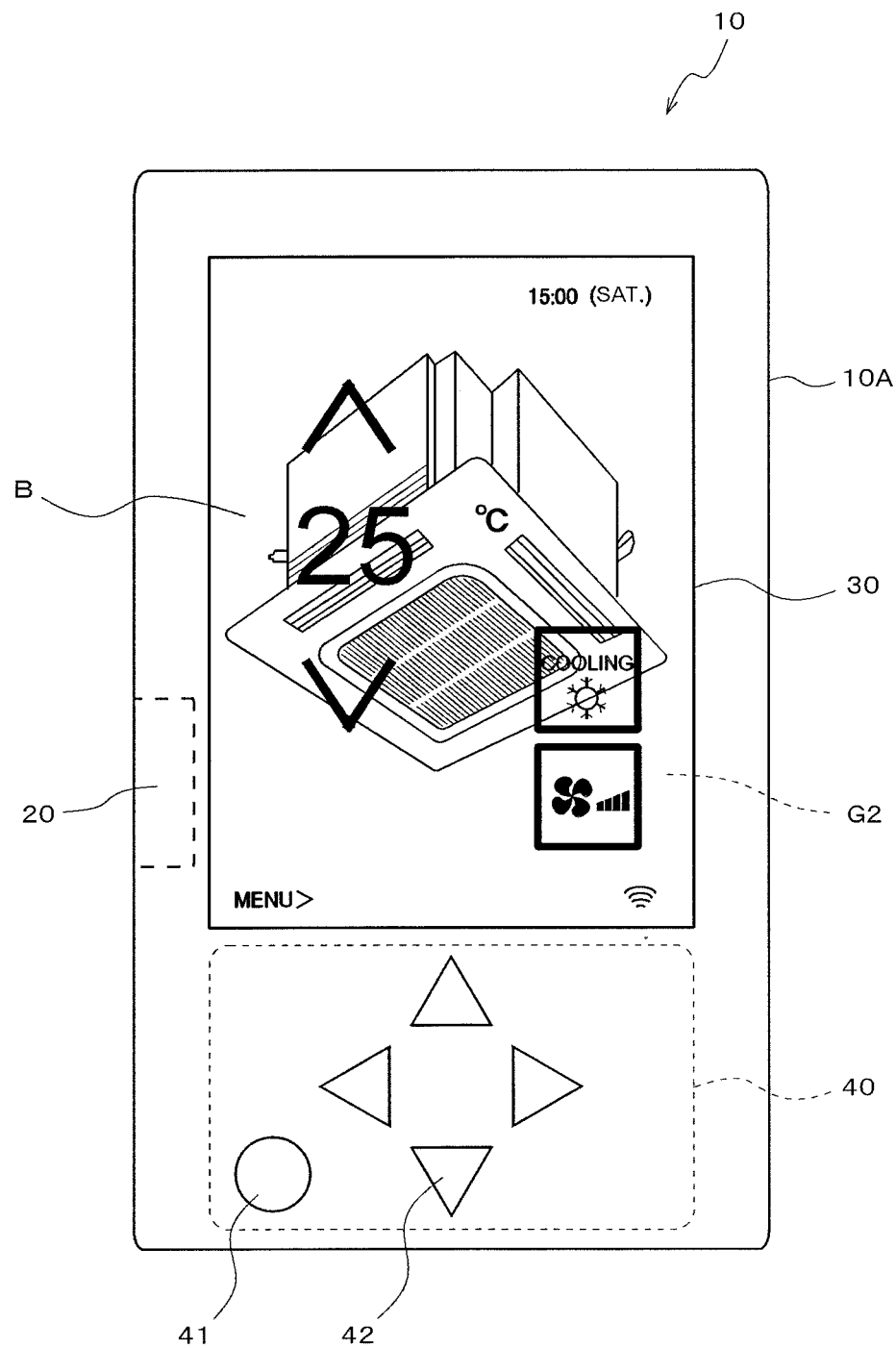
FIG. 6 illustrates a state in which image data is displayed on the display unit of the air-conditioning remote controller illustrated in FIG. 1 as the background of a settings management screen.
Figure 7:
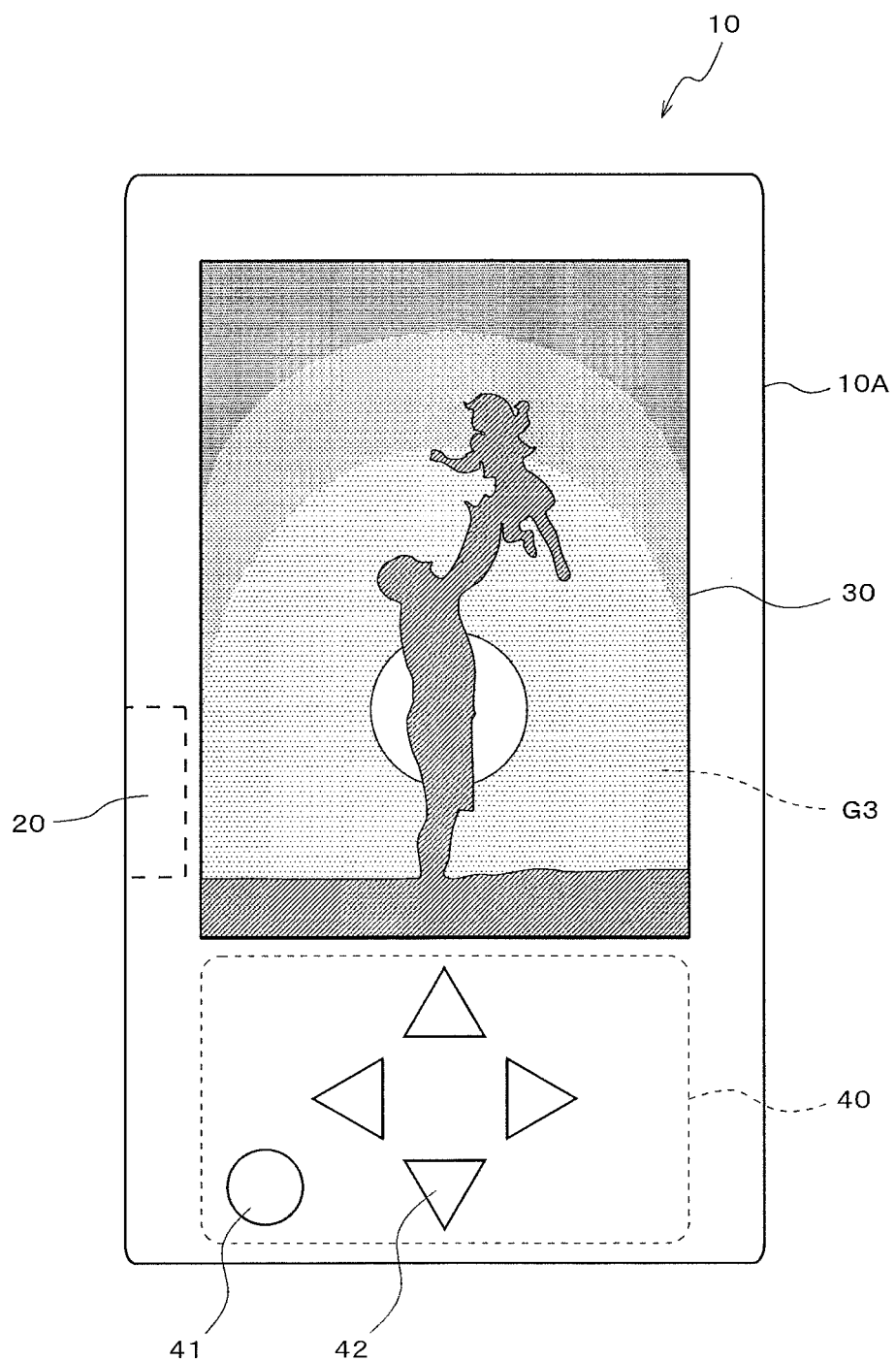
FIG. 7 illustrates a state in which image data is displayed on the entire screen of the display unit of the air-conditioning remote controller illustrated in FIG. 1.
Figure 8:
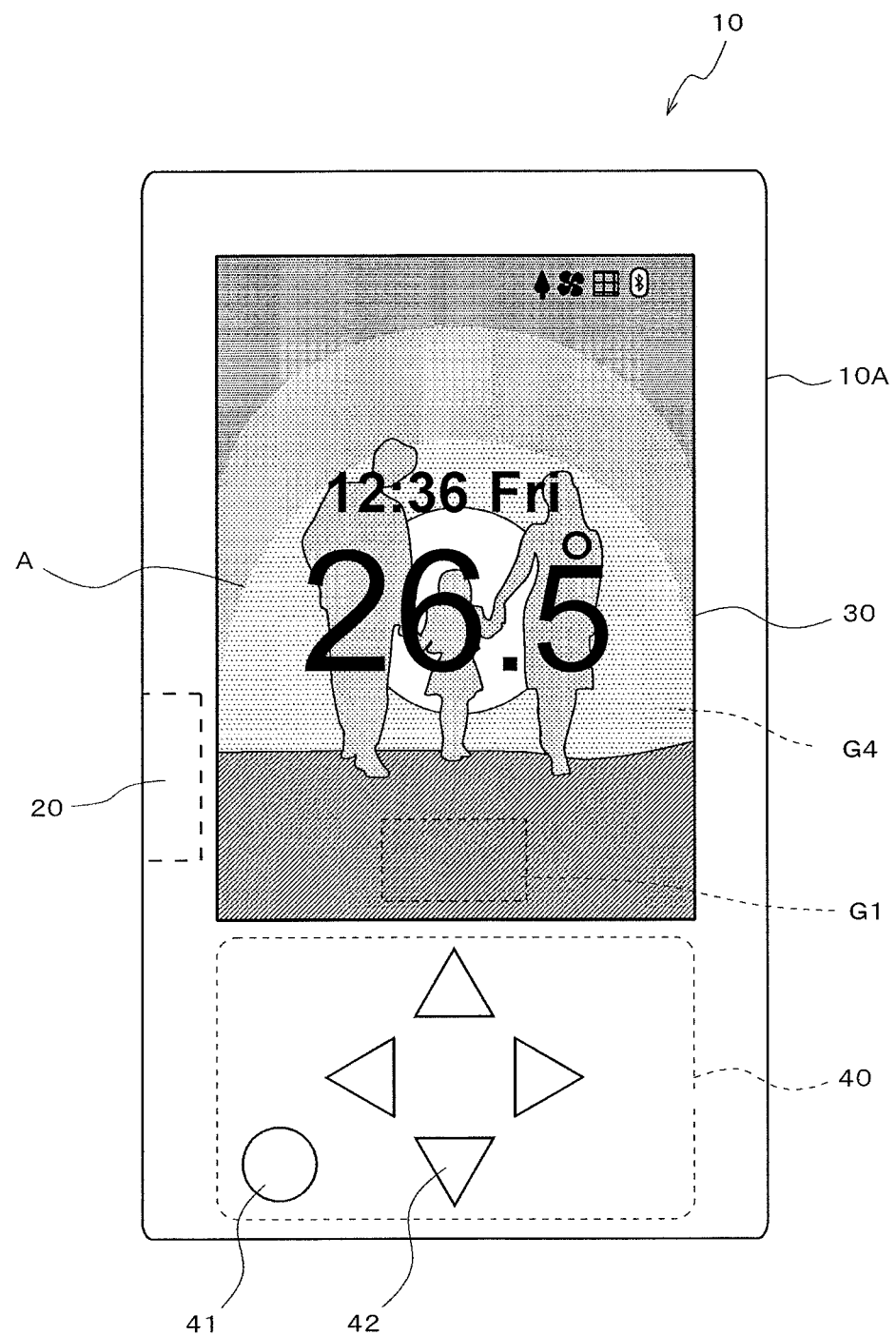
FIG. 8 illustrates a state in which two pieces of image data are displayed, together with a settings management screen, on the display unit of the air-conditioning remote controller illustrated in FIG. 1.

FIG. 5 illustrates a state in which image data G is displayed on the display unit 30 of the air-conditioning remote controller 10 illustrated in FIG. 1. FIG. 6 illustrates a state in which image data G is displayed on the display unit 30 of the air-conditioning remote controller 10 illustrated in FIG. 1 as the background of a settings management screen. FIG. 7 illustrates a state in which image data G is displayed on the entire screen of the display unit 30 of the air-conditioning remote controller 10 illustrated in FIG. 1. FIG. 8 illustrates a state in which two pieces of image data G are displayed, together with a settings management screen, on the display unit 30 of the air-conditioning remote controller 10 illustrated in FIG. 1. With reference to FIGS. 5 to 8, the following describes a display process for image data G executed by the display processing unit 52B of the air-conditioning remote controller 10.

In the case shown in FIG. 5, the display processing unit 52B displays a settings management screen A and image data G1 on the display unit 30. The settings management screen A is a normal display screen such as a wallpaper screen. The display processing unit 52B displays the image data G1 in the lower center of the screen of the display unit 30, based on display settings set by the image settings processing unit 52A. Examples of image data G1 contemplated herein include a logo indicating information such as the name of a hotel where the air-conditioning apparatus 200 is placed, a logo indicating information such as the name of a company, a logo indicating information such as the name of the servicing company of the air-conditioning apparatus 200, and a personal photograph.

By using a configuration in which the display processing unit 52B displays, as the image data G1, a logo indicating information such as the name of a hotel or a logo indicating information such as the name of a servicing company, it is possible to uplift the customer's feeling of having his or her own air-conditioning apparatus, without having a similar indication printed on the housing of the air-conditioning apparatus. This leads to cost reduction. If the display processing unit 52B displays, as the image data G1, a logo indicating information such as the name of a hotel or a logo indicating information such as the name of a servicing company, this makes it possible to provide an advertising effect for the hotel or the servicing company. If the display processing unit 52B displays the above-mentioned logos on the main screen such as the normal display screen illustrated in FIG. 5, it is possible to further uplift the advertising effect. Alternatively, however, the display processing unit 52B may display, as the image data G1, the photograph of the face of a person such as the person in charge in the servicing company.

If the air-conditioning apparatus 200 is installed in a hotel, the display processing unit 52B may display, as the image data G1, for example, a logo indicating information such as the name of the company of a guest who stays at the hotel for a long period of time or a repeat guest currently staying at the hotel, or a personal photograph of such a guest. This helps further uplift the customer's feeling of having his or her own air-conditioning apparatus, thus further enhancing the customer satisfaction of hotel guests. In addition, if the air-conditioning apparatus 200 is installed in a place such as a private room, the display processing unit 52B may display, as image data G, information representing the photograph of the face of the user of the air-conditioning apparatus 200, as the background of the main screen.

In the case of FIG. 6, the display processing unit 52B displays, on the display unit 30, a settings management screen B used for changing temperature settings, and image data G2 as the background of the settings management screen B. The image data G2 illustrated in FIG. 6 is the data of a photograph representing the air-conditioning apparatus 200, for example, the indoor unit to be operated with the air-conditioning remote controller 10. As described above, the air-conditioning remote controller 10 makes it possible to display, on the display unit 30, information such as a photograph taken by the communication terminal 100.

The air-conditioning remote controller 10 may display, for example, characters representing the name of a meeting room or other places, on the screen of the display unit 30 as information indicating where the air-conditioning apparatus 200 is installed. Alternatively, instead of characters representing the name of a meeting room or other places, the air-conditioning remote controller 10 may display a photograph of the meeting room or other places. For example, the air-conditioning remote controller 10 may display, as image data G showing where the air-conditioning apparatus 200 is installed, a general arrangement image that includes the air-conditioning apparatus 200, lighting equipment, seats, and other objects and allows for easier identification of the air-conditioning apparatus 200 than a floor map.

Further, a configuration may be employed in which user's selection of the air-conditioning apparatus 200 in the general arrangement image displayed on the display unit 30 causes, for example, a setting management screen to be displayed as illustrated in FIG. 6 whose background is the image data G2 representing the air-conditioning apparatus 200. In other words, the air-conditioning remote controller 10 may be configured to, upon selection of the air-conditioning apparatus 200 in the general arrangement image, display a settings management screen that allows adjustment of the temperature setting, airflow direction, or other settings of the air-conditioning apparatus 200, thus making it possible to adjust the temperature setting, airflow direction, or other settings of the air-conditioning apparatus 200.

In addition, the air-conditioning remote controller 10 may be able to acquire, as image data G, a general arrangement image captured by a 3D camera. The 3D camera may be provided to the imaging unit 170 of the communication terminal 100, may be provided to the air-conditioning remote controller 10, or may be set up at an external location. This makes it possible to display a view of the surroundings of the air-conditioning apparatus 200 in a three-dimensional and contiguous manner, allowing for enhanced identification of the air-conditioning apparatus 200 by the user.

The air-conditioning apparatus 200 may be configured to have an air-conditioning-apparatus-side imaging unit (not illustrated) including a camera. The air-conditioning remote controller 10 may be configured to acquire, as image data G, a general arrangement image that is captured by the air-conditioning-apparatus-side imaging unit from the viewpoint of the air-conditioning apparatus 200. Further, if the air-conditioning-apparatus-side imaging unit is configured to include a 3D camera, the air-conditioning remote controller 10 is able to acquire and display a general arrangement image that allows for further enhanced identification of the air-conditioning apparatus 200.

The user may be allowed to make settings such as what kind of airflow is to be sent to which area, through an operation based on the above-mentioned general arrangement image. That is, for example, the user may be allowed to make settings such as a place to which air is to be sent, airflow direction, and the amount of airflow by operating, via the operating unit 40, a cursor or other pointers on the display unit 30 that is showing the general arrangement image. If a touch panel is employed as the display unit 30, the user may be allowed to make settings such as a place to which air is to be sent, airflow direction, and the amount of airflow by performing an operation such as a touch operation, a slide operation, or a flick operation on the display unit 30 that is showing the general arrangement image.

If the air-conditioning remote controller 10 is configured to display a photograph captured by the communication terminal 100 or other devices and showing the air-conditioning apparatus 200 or the place where the air-conditioning apparatus 200 is installed, this enables the user to more strongly recognize the air-conditioning apparatus 200 that is to be operated. In the example illustrated in FIG. 6, information of the settings management screen B in the memory unit 60 contains information such as the current operational state of the air-conditioning apparatus 200, and accordingly, the display processing unit 52B displays information such as the current operational state of the air-conditioning apparatus 200 on the display unit 30.

FIG. 7 illustrates an exemplary case in which a transfer to the standby mode is made in accordance with a setting or an operation. In the case shown FIG. 7, the display processing unit 52B displays image data G3 on the display unit 30. FIG. 7 illustrates, as the image data G3, data of a photograph showing an adult and a child. In Embodiment 1, various photographs or other images captured by the communication terminal 100 can be displayed in the standby mode in which a settings management screen is not displayed. As a result, the air-conditioning remote controller 10 can be used for other uses, such as a photo frame. In other words, the air-conditioning remote controller 10 allows, for example, a guest staying at a hotel for a long period of time to place a family photo or any other such photograph without use of a photo stand. This helps enhancement of customer satisfaction.

Although FIG. 7 illustrates a photograph showing human persons as the image data G3, this should not be construed restrictively. For example, the image data G3 may be image data identical in color and pattern to the wallpaper in a room or other places where the air-conditioning apparatus 200 is installed. Further, the image data G3 may be data of a photograph, captured by the communication terminal 100 or other devices, of the wallpaper in a room or other places where the air-conditioning apparatus 200 is installed. This ensures that the display unit 30 blends in with the wallpaper in a room or other places to enhance the sense of integration of the air-conditioning remote controller 10 with the room or other places. This helps reduce the sense of presence of the air-conditioning remote controller 10, thus providing an enhanced relaxing effect. Further, the air-conditioning remote controller 10 may be configured to provide an enhanced sense of integration with a room or other places by employing a frameless liquid crystal display, by employing a frame visually integrated with the wallpaper or other features in the room, by employing a wall-embedded design, or by using a combination of these structural features.

The image data G may be, for example, image data different in color and pattern from the wallpaper in a room or other places where the air-conditioning apparatus 200 is installed. This helps enhance the visibility and recognizability of the air-conditioning remote controller 10, thus allowing the user to locate the air-conditioning remote controller 10 at a glance.

Alternatively, however, the air-conditioning remote controller 10 may be configured to combine image data G identical in color or other features to the wallpaper in a room or other places where the air-conditioning apparatus 200 is installed, with image data G different in color or other features from the wallpaper in the room or other places where the air-conditioning apparatus 200 is installed, and associate the resulting image data with the standby mode and with each settings management screen. The air-conditioning remote controller 10 employing such a configuration makes it possible to adjust a displayed image in accordance with the user's usage condition or other circumstances, such that the sense of presence is reduced when in the standby mode and the visibility thereof is increased at the time of making various settings.

In the case of FIG. 8, the display processing unit 52B displays, on the display unit 30, the settings management screen A, and image data G4 as the background of the settings management screen A. The display processing unit 52B also displays the image data G1 in a superimposed manner over the image data G4. As described above, the display processing unit 52B is able to display a plurality of pieces of image data G on each settings management screen in accordance with display settings set by the image settings processing unit 52A. In other words, the air-conditioning remote controller 10 makes it possible to combine the advantages obtained by individual configurations described above with reference to FIGS. 5 to 7 in which a single piece of image data G is displayed, allowing for an even further enhanced effect.

Figure 11:
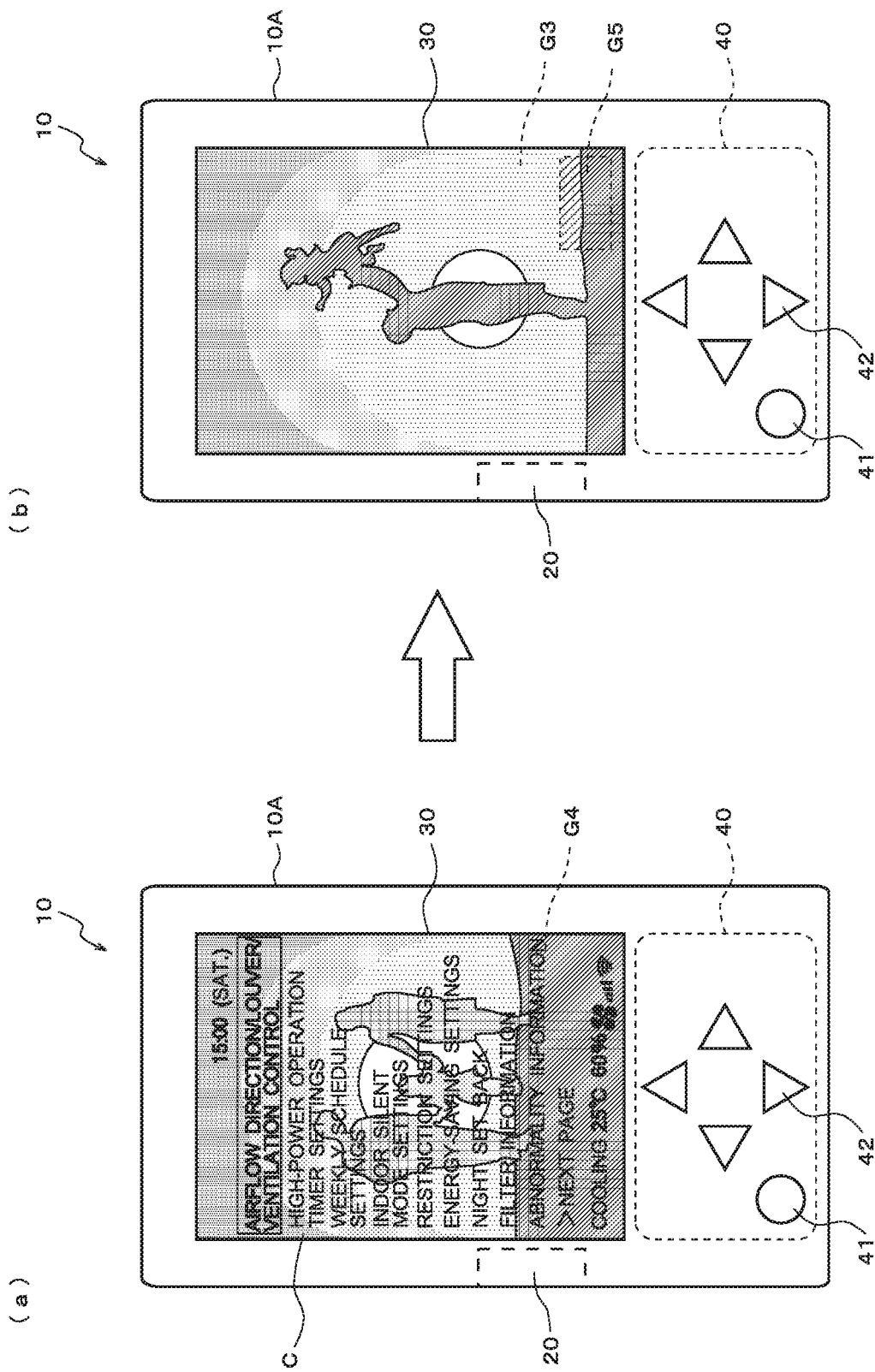
FIG. 11 illustrates another exemplary image data switching process performed in response to a change in a settings management screen on the display unit illustrated in FIG. 1.

FIG. 9 is a table illustrating an exemplary display switching table created and changed by the image settings processing unit 52A illustrated in FIG. 4. FIG. 10 illustrates an exemplary switching process for image data G performed in response to a change in a settings management screen on the display unit 30 illustrated in FIG. 1. FIG. 11 illustrates another exemplary switching process for image data G performed in response to a change in a settings management screen on the display unit 30 illustrated in FIG. 1. With reference to FIGS. 9 to 11, the following describes a switching process for image data G executed by the display processing unit 52B of the air-conditioning remote controller 10.

In the display switching table illustrated in FIG. 9, the standby mode is associated with the image data G3 and image data G5, the settings management screen A is associated with the image data G3, the settings management screen B is associated with the image data G1 and the image data G2, and a settings management screen C, which is a settings menu screen, is associated with the image data G4. In the display switching table illustrated in FIG. 9, for the standby mode, the image data G3 is set as full-display image data, which is image data displayed on the entire screen of the display unit 30, and the image data G5 is set as partial-display image data, which is image data displayed on a portion of the screen of the display unit 30. The image data G5 is set to be placed at the lower right. For the settings management screen A, the image data G3 is set as full-display image data. In the settings management screen B, the image data G1 is set as partial-display image data, and the image data G2 is set as full-display image data. The image data G1 is set to be placed at the lower center. For the settings management screen C, the image data G4 is set as full-display image data.

Now, a case is considered in which the display processing unit 52B references the display switching table illustrated in FIG. 9 to perform a switching process for image data G. As illustrated in FIG. 10(a), when displaying the settings management screen A on the display unit 30, the display processing unit 52B displays the image data G3 as the background of the settings management screen A. Then, as illustrated in FIG. 10(b), at the time of transition to the settings management screen B in response to a user operation, the display processing unit 52B displays the image data G2 as the background of the settings management screen B, and also displays the image data G1 in a superimposed manner over a portion of the image data G2. In the case of FIG. 10(b), the display processing unit 52B displays the image data G1 at the lower center of the display unit 30 in accordance with placement settings set by the image settings processing unit 52A.

Further, as illustrated in FIG. 11(a), at the time of transition to the settings management screen C in response to a user operation, the display processing unit 52B displays the image data G4 as the background of the settings management screen C. Then, as illustrated in FIG. 11(b), at the time of transition to the standby mode in accordance with a setting or an operation, the display processing unit 52B erases the settings management screen C and then displays the image data G3, and also displays the image data G5 in a superimposed manner over a portion of the image data G3. In the case of FIG. 11(b), the display processing unit 52B displays the image data G5 at the lower right of the display unit 30 in accordance with placement settings set by the image settings processing unit 52A.

Although FIG. 9 illustrates the case in which image settings and placement settings for image data G are specified in the display switching table, this should not be construed restrictively. Image data G may be associated with image settings and placement settings in, for example, a table different from the display switching table.

Figure 12:
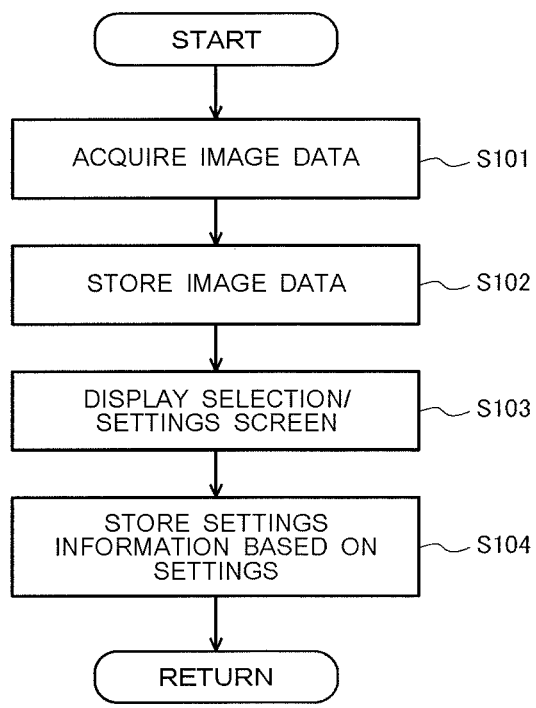
FIG. 12 is a flowchart illustrating how the control unit illustrated in FIG. 4 operates when acquiring image data.

FIG. 12 is a flowchart illustrating how the control unit 50A illustrated in FIG. 4 operates when acquiring image data. With reference to FIG. 12, the following describes operation related to an acquisition process and a setting process for image data G that are performed by the control unit 50A.

When the user selects and transmits image data G with the communication terminal 100, the image acquisition processing unit 51 acquires the image data G from the communication terminal 100 via the wireless interface 20 (step S101). Then, the image acquisition processing unit 51 stores the image data G acquired from the communication terminal 100 into the memory unit 60 (step S102).

Next, the display management unit 52 displays a selection/settings screen on the display unit 30 (step S103). Then, when the user operates the operating unit 40, and display settings are established on the selection/settings screen, the display management unit 52 stores, into the memory unit 60, a display switching table or other information as settings information based on the display settings (step S104).

Figure 13:
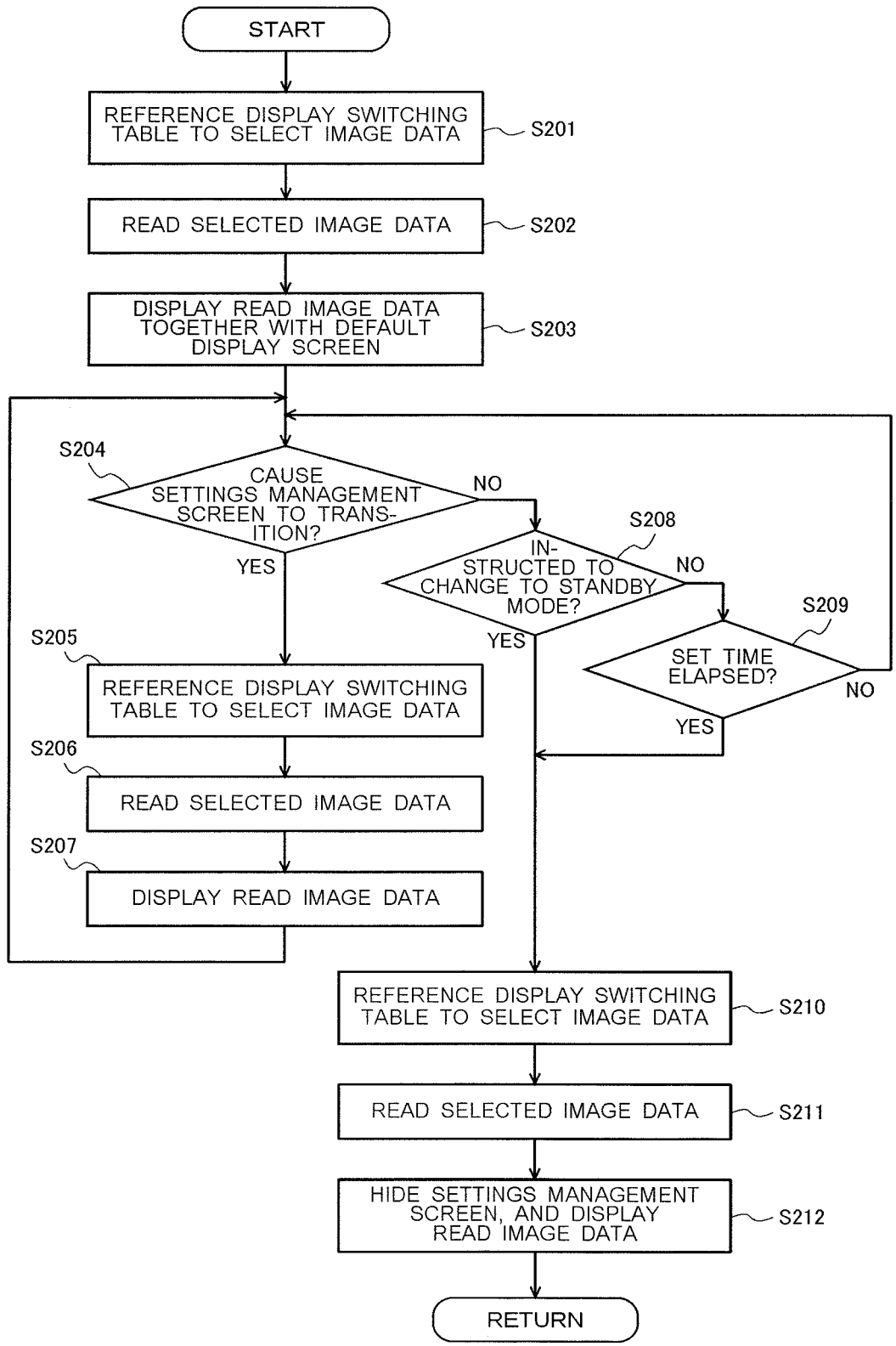
FIG. 13 is a flowchart illustrating how the control unit illustrated in FIG. 4 operates when displaying image data.

FIG. 13 is a flowchart illustrating how the control unit 50A illustrated in FIG. 4 operates when displaying image data G. With reference to FIG. 13, a display process and a switching process for image data G that are performed by the control unit 50A will be explained. The following description will be directed to the case in which, with the air-conditioning remote controller 10 in the standby mode, the control unit 50A uses a display switching table to perform a selection process for image data G.

In response to depression of the ON/OFF key 41 or the operating key 42 by the user, the display management unit 52 references the display switching table to select image data G corresponding to the default display screen (step S201), and reads the selected image data G from the memory unit 60 (step S202). Then, the display management unit 52 displays the read image data G on the display unit 30 together with the default display screen (step S203).

When the user performs, by using the operating unit 40, an operation causing a transition of the current settings management screen (step S204/Yes), the display management unit 52 references the display switching table to select image data G corresponding to the post-transition settings management screen (step S205), and reads the selected image data G from the memory unit 60 (step S206). Then, the display management unit 52 displays the read image data G on the display unit 30 together with the post-transition settings management screen (step S207), and the process returns to step S204.

If the user performs neither an operation causing a transition of the current settings management screen nor an operation instructing to change to the standby mode be made (step S204/No, step S208/No), the display management unit 52 waits until a set time is elapsed (step S209/No).

If the user who has not performed an operation that causes a transition of the current settings management screen (step S204/No) performs an operation instructing to change to the standby mode be made (step S208/Yes), the display management unit 52 references the display switching table to select image data G corresponding to the standby mode (step S210), and reads the selected image data G from the memory unit 60 (step S211). Then, the display management unit 52 hides the settings management screen displayed until just before, and displays the read image data G on the display unit 30 (step S212).

As described above, the air-conditioning remote controller 10 displays, on the display unit 30, image data G acquired from the communication terminal 100 via radio communication. As a result, in addition to information related to operations on the air-conditioning apparatus 200, information not related to operations on the air-conditioning apparatus 200 can be displayed, thus allowing the display unit 30 to be used for other uses.

More specifically, since the air-conditioning remote controller 10 acquires image data G via radio communication from the communication terminal 100, which is an external terminal, image data G suited to an intended use can be acquired from within the communication terminal 100. Consequently, an image suited for the usage condition of users including the administrator and the end user can be displayed on the display unit 30. In other words, in addition to information related to operations on the air-conditioning apparatus 200, the air-conditioning remote controller 10 is able to display, on the display unit 30, information such as image data acquired via a network or image data captured with a camera. As a result, the air-conditioning remote controller 10 makes it possible to take advantage of the image representation capability of a full-dot liquid crystal display, allowing for enhancement of user's comfort.

That is, the display processing unit 52B has a function of displaying image data G on the entire screen of the display unit 30. Consequently, for instance, the air-conditioning remote controller 10 can be used as, for example, a photo frame by displaying image data G that is photograph data. By displaying image data G similar to indoor wallpaper, the air-conditioning remote controller 10 can be less visible, allowing for enhanced user's comfort. Further, by displaying, for example, image data G vastly different in color and pattern from indoor wallpaper, the visibility and recognizability of the air-conditioning remote controller 10 can be enhanced. Further, the display processing unit 52B has a function of displaying image data G on the entire screen of the display unit 30 as the background of a settings management screen. This makes it possible to provide various impressions to the user operating the air-conditioning remote controller 10.

Further, the display processing unit 52B displays image data G on a portion of the screen of the display unit 30. In addition, the display processing unit 52B has a function of, in a manner superimposed over the image data G to be displayed on the entire screen of the display unit 30, displaying another piece of image data G or other pieces of image data G on a portion of the screen of the display unit 30. Consequently, by displaying information such as a company logo on a portion of the screen of the display unit 30, the air-conditioning remote controller 10 makes it possible to provide an advertising effect for a company or other entities.

The display processing unit 52B selects, in response to a transition of the current settings management screen, image data G corresponding to the settings management screen from the display switching table, and displays the selected image data G on the display unit 30. Further, when switching to the standby mode, the display processing unit 52B displays, on the display unit 30, image data G associated with the standby mode. As described above, the air-conditioning remote controller 10 is able to display image data G suited to the user's needs. As a result, it is possible for the user to include, in image data G, contents for which the user wants to make him/herself or someone else to be impressed therewith during the standby mode and on each settings management screen.

Embodiment 2

Figure 15:
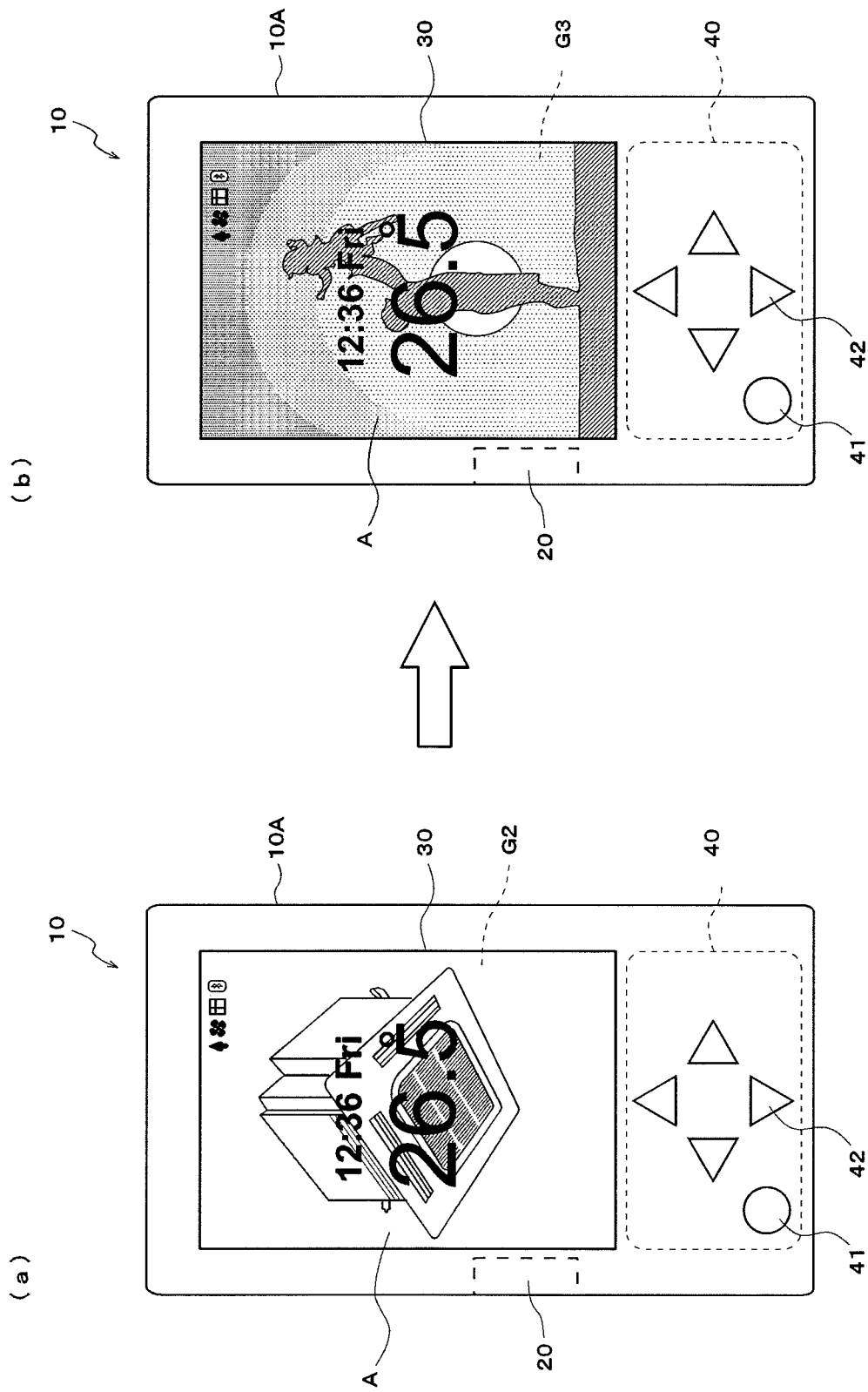
FIG. 15 illustrates an exemplary image data switching process on the display unit of the air-conditioning remote controller according to Embodiment 2 of the present invention.
Figure 16:
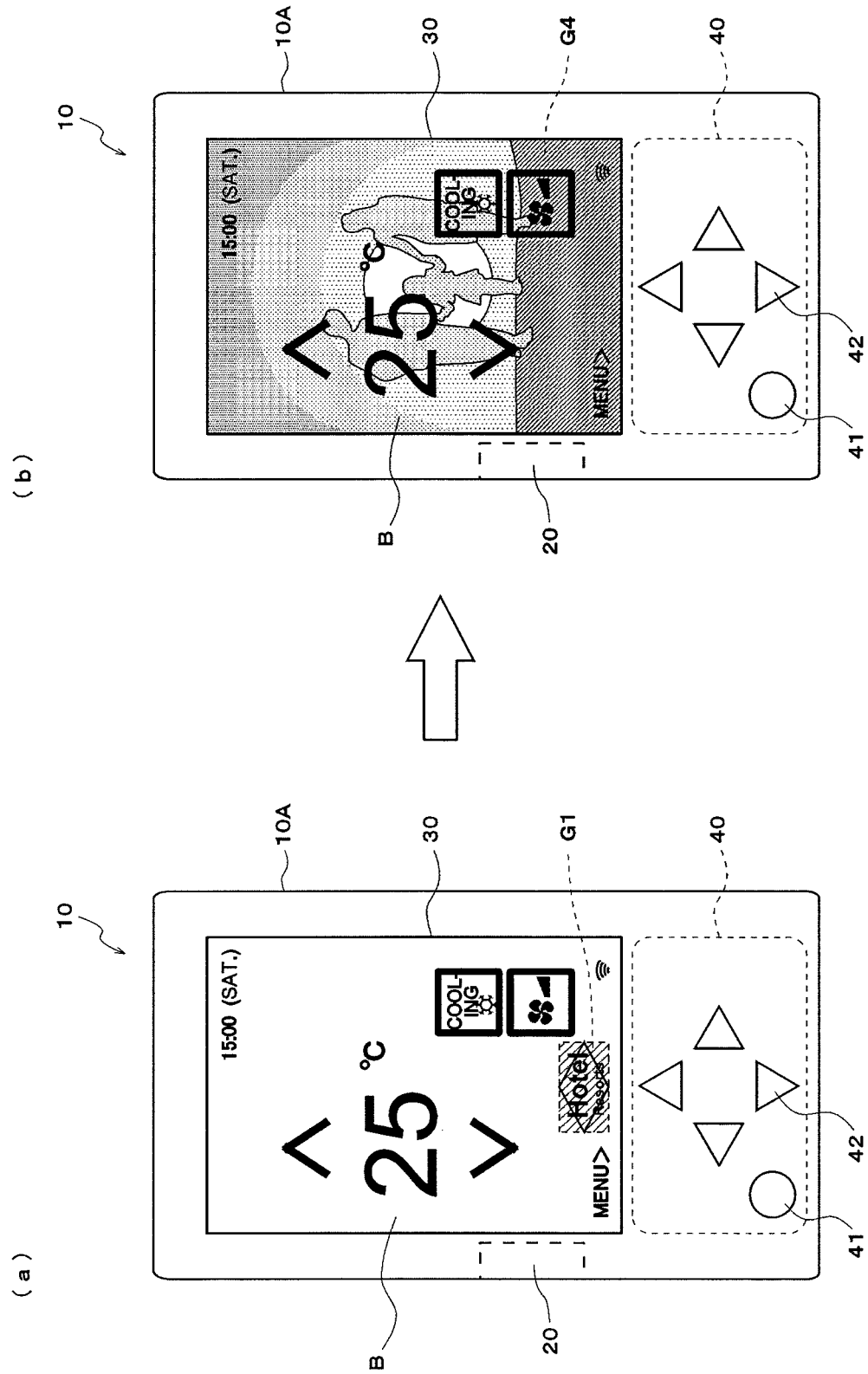
FIG. 16 illustrates another exemplary image data switching process on the display unit of the air-conditioning remote controller according to Embodiment 2 of the present invention.

FIG. 14 illustrates an exemplary display switching table created and changed by the control unit of an air-conditioning remote controller according to Embodiment 2 of the present invention. FIG. 15 illustrates an exemplary image data switching process on the display unit of the air-conditioning remote controller according to Embodiment 2 of the present invention. FIG. 16 illustrates another exemplary image data switching process on the display unit of the air-conditioning remote controller according to Embodiment 2 of the present invention.

The air-conditioning remote controller according to Embodiment 2 is similar in general arrangement, hardware configuration, and functional configuration to the air-conditioning apparatus described above with reference to Embodiment 1. Accordingly, in the following, the configuration and operation of the air-conditioning remote controller according to Embodiment 2 will be described with reference to FIGS. 1 to 4 together with FIGS. 14 to 16, by using the same reference signs as those used in Embodiment 1. The following description of Embodiment 2 is made on the assumption that a display switching table as illustrated in FIG. 14 is stored in the memory unit 60. The display switching table is created by the control unit 50A by associating image data G stored in the memory unit 60 with each settings management screen and with the standby mode. In the display switching table, each piece of image data G is registered as standard image information.

In Embodiment 2, the memory unit 60 stores replacement image data used to replace another image data. The air-conditioning remote controller 10 has a function of, in response to a user operation, replacing image data G registered as standard image information with replacement image data.

In other words, the image settings processing unit 52A has a function of changing the association of image data G with the standby mode and with a settings management screen in the display switching table. That is, the image settings processing unit 52A performs a replacement setting that replaces a piece of image data G associated with the standby mode or a settings management screen in the display switching table, with another piece of image data G stored in the memory unit 60. In accordance with the replacement setting performed by the image settings processing unit 52A, the display processing unit 52B replaces a piece of image data G associated with the standby mode or a settings management screen in the display switching table, with another piece of image data G, and displays the replaced image data G on the display unit 30. That is, the display processing unit 52B has a function of replacing the image data G being currently displayed on the display unit 30, with replacement image data.

More specifically, the air-conditioning remote controller 10 has a function of, in response to a user operation, replacing standard image information with a specific piece of image data G selected from among image data G stored in the memory unit 60. If such a configuration is to be employed, it is desirable to store a stock of replacement image data in the memory unit 60 in advance. The air-conditioning remote controller 10 also has a function of, in response to acquisition of image data G selected by the user on the communication terminal 100, replacing standard image information with the acquired image data G upon user's request.

The memory unit 60 according to Embodiment 2 stores information of a replacement settings screen used by the user to replace standard image information. That is, the display management unit 52 has a function of, in response to a user operation or in response to acquisition of image data G by the image acquisition processing unit 51 from the communication terminal 100, displaying the replacement settings screen on the display unit 30. The image settings processing unit 52A performs a setting that, in accordance with the settings specified by the user, replace a specified piece of standard image information with another piece of image data G. More specifically, for example, the image settings processing unit 52A has a function of changing the settings information such that image data G specified by the user is set as new standard image information. The image settings processing unit 52A also has a function of managing standard image information and replacement image data in association with calendar information or other information. That is, the image settings processing unit 52A is able to change the settings information such that, in accordance with the day of the week or the time of day set by the user, standard image information is replaced with replacement image data. As illustrated in FIG. 14, the image settings processing unit 52A may, for example, associate standard image information with replacement image data in the display switching table. It is to be noted, however, that when setting the replacement image data as new standard image information, the image settings processing unit 52A executes rewriting of the standard image information.

The display processing unit 52B has a function of, in accordance with the settings information changed by the image settings processing unit 52A, executing replacement of standard image information. The following describes a case in which the display processing unit 52B executes such a replacement process by use of the display switching table illustrated in FIG. 14.

In the display switching table illustrated in FIG. 14, the standby mode is associated with the image data G2 through the image data G4, the settings management screen A is associated with the image data G2, the settings management screen B is associated with the image data G1, and the settings management screen C, which is a settings menu screen, is associated with the image data G4 and the image data G5. The image data G2 as the standard image information for the settings management screen A is associated with the image data G3 serving as replacement image data. The image data G1 as the standard image information for the settings management screen B is associated with the image data G4 serving as replacement image data. It is assumed here that the image data G1 and the image data G5 are set as partial-display image data, and the image data G2 through the image data G4 are set as full-display image data.

A case is considered in which, while the image data G2 is displayed as the background of the settings management screen A as illustrated in FIG. 15(a), an instruction or some other such indication to replace the image data G2 is given from the user. In this case, the display processing unit 52B replaces the image data G2 with the image data G3 as illustrated in FIG. 15(b). Further, a case is considered in which, while the image data G1 is displayed in association with the settings management screen B as illustrated in FIG. 16(a), an instruction or some other such indication to replace the image data G1 is given from the user. In this case, the display processing unit 52B replaces the image data G1 with the image data G4 as illustrated in FIG. 16(b).

The display management unit 52A is able to, in response to a user operation, associate the standby mode or one settings management screen with a plurality of pieces of image data G each set as full-display image data, as illustrated in FIG. 14. In this case, in the standby mode, the display processing unit 52B displays the plurality of pieces of image data G2 through image data G4 at predetermined time intervals in a slide show.

As described above, the air-conditioning remote controller 10 according to Embodiment 2 has the function of changing the association settings for the display switching table. Consequently, the air-conditioning remote controller 10 makes it possible for the user to replace, as required, the image data G to be displayed on the display unit 30. This helps enhance user's comfort. Otherwise, Embodiment 2 is similar in its effect to Embodiment 1.

Embodiment 3

Figure 17:
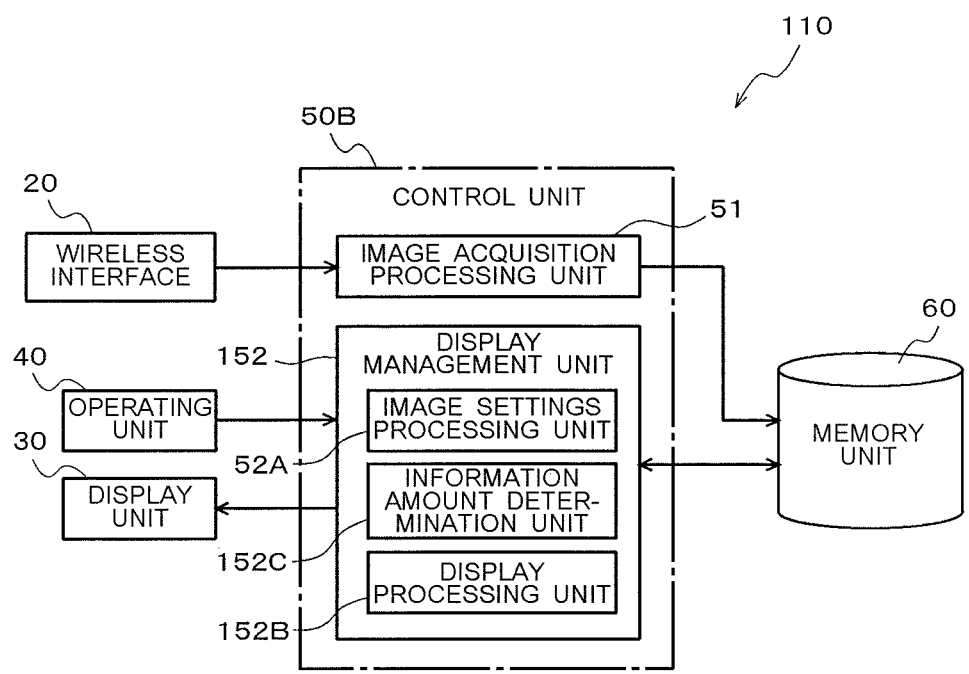
FIG. 17 is a block diagram illustrating the functional configuration of an air-conditioning remote controller according to Embodiment 3 of the present invention.

FIG. 17 is a block diagram illustrating the functional configuration of an air-conditioning remote controller according to Embodiment 3 of the present invention. As illustrated in FIG. 5, the normal display screen such as wallpaper screen is configured to show only minimum information such as numbers. By contrast, some settings management screens display a large amount of information in terms of the number of characters displayed or information display area. If image data G is displayed as the background of or on a portion of such a settings management screen that displays a large amount of information, this may in some cases make it difficult to view information displayed on the settings management screen. Accordingly, an air-conditioning remote controller 110 according to Embodiment 3 is configured to hide image data G if the amount of information to be displayed on a settings management screen is greater than or equal to a predetermined value. Since the air-conditioning remote controller 110 according to Embodiment 3 is similar in general arrangement, hardware configuration, and functional configuration to the air-conditioning remote controller 10 according to Embodiment 1 or 2 described above, the same or like features will be designated by the same reference signs and will not be described in further detail.

As illustrated in FIG. 17, the air-conditioning remote controller 110 includes a control unit 50B. The control unit 50B includes the image acquisition processing unit 51, and a display management unit 152. The display management unit 152 includes the image settings processing unit 52A, an information amount determination unit 152C, and a display processing unit 152B.

The information amount determination unit 152C is configured to, when one settings management screen transitions to another, compare the amount of information to be displayed on the post-transition settings management screen with a preset threshold to thereby determine whether the amount of information to be displayed is greater than or equal to the threshold. If the information amount determination unit 152C determines that the amount of information to be displayed is greater than or equal to the threshold, the information amount determination unit 152C outputs, to the display processing unit 152B, a display change command to change the display state of image data G. In Embodiment 3, the display change command output by the information amount determination unit 152C is an image hide command that hides image data G.

The display processing unit 152B is configured to, in response to a display change command from the information amount determination unit 152C, hide image data G on the screen of the display unit 30. That is, the display processing unit 152B is configured such that, when a settings management screen transitions to another settings management screen that displays an amount of information greater than or equal to a threshold, even if image data G associated with the post-transition settings management screen exists, the display processing unit 152B does not display the image data G on the display unit 30. Accordingly, for example, in the case of a setting that displays the same image data G in the standby mode and on each settings management screen, the display processing unit 152B hides the image data G while a settings management screen with an amount of displayed information greater than or equal to a threshold is displayed. Otherwise, the display processing unit 152B is similar in configuration to the display processing unit 52B according to each of Embodiments 1 and 2 mentioned above.

Figure 18:
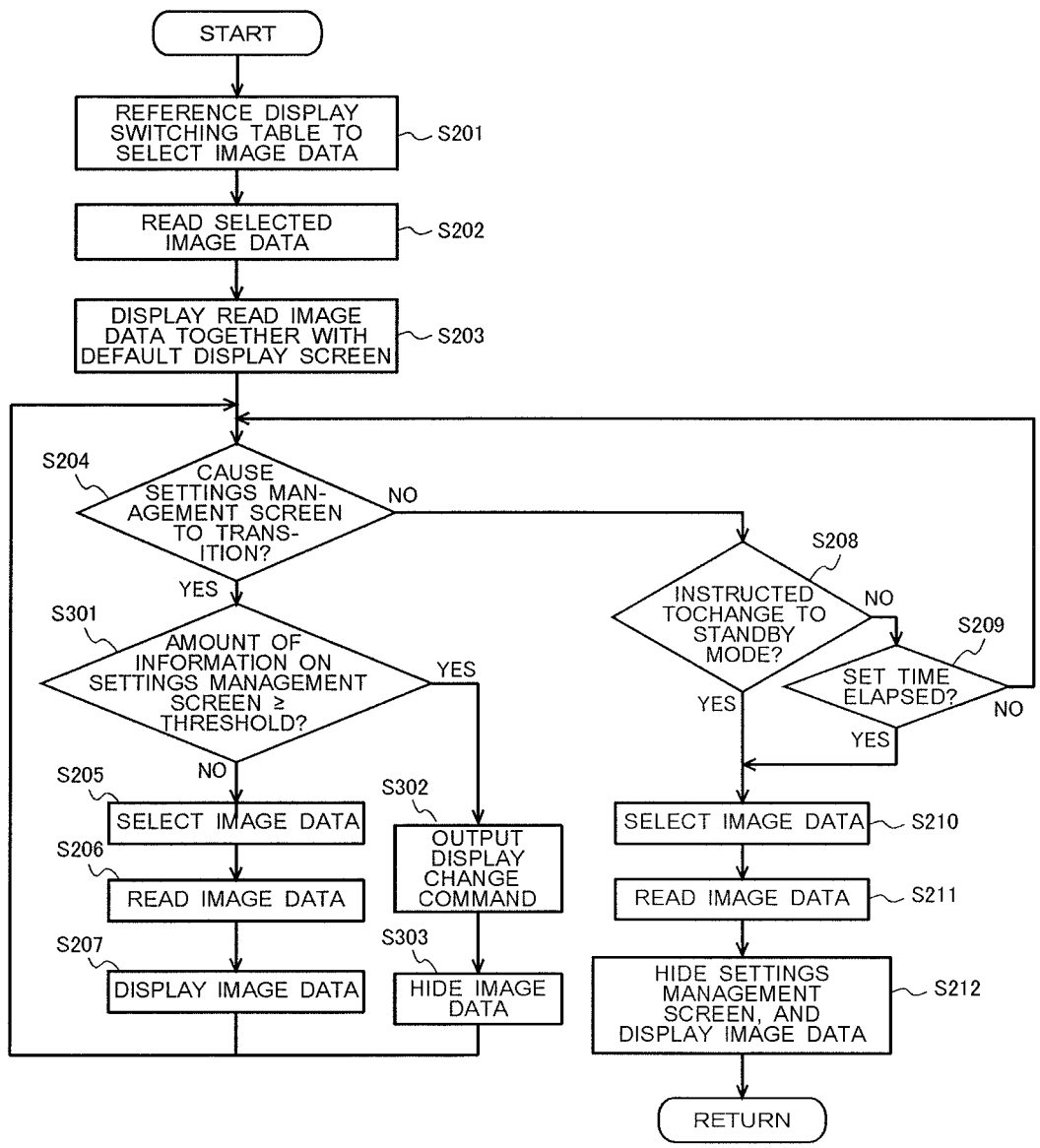
FIG. 18 is a flowchart illustrating how the control unit illustrated in FIG. 17 operates when displaying image data.

FIG. 18 is a flowchart illustrating how the control unit 50B illustrated in FIG. 17 operates when displaying image data G. With reference to FIG. 18, the following describes operation related to an acquisition process and a setting process for image data G that are performed by the control unit 50B. The following description is directed to a case in which the standby mode and each settings management screen are associated with the corresponding image data. In FIG. 18, steps similar to those in FIG. 13 will be designated by the same reference signs and will not be described in further detail.

As with the air-conditioning remote controller 10 illustrated in FIG. 13, the air-conditioning remote controller 110 executes steps S201 to S203. Then, when the user performs, by use of the operating unit 40, an operation that causes a transition of the current settings management screen (step S204/Yes), the information amount determination unit 152C acquires, from the memory unit 60, information to be displayed on the post-transition settings management screen, and determines whether the amount of information to be displayed is greater than or equal to the threshold (step S301). If the information amount determination unit 152C determines that the amount of information to be displayed is greater than or equal to the threshold (step S301/Yes), the information amount determination unit 152C outputs a display change command to the display processing unit 152B (step S302). Upon receiving an output of the display change command from the information amount determination unit 152C, the display processing unit 152B hides image data G at the time of transition of the current settings management screen (step S303), and the process returns to step S204.

If the information amount determination unit 152C determines that the amount of information to be displayed is less than the threshold (step S301/No), the information amount determination unit 152C provides no command to the display processing unit 152B. Accordingly, as in the case of FIG. 13, the display processing unit 152B executes steps S205 to S207, and the process returns to step S204. That is, when a settings management screen with an amount of displayed information greater than or equal to the threshold transitions to another settings management screen with an amount of displayed information less than the threshold, the display processing unit 152B displays image data G associated with the post-transition settings management screen. Further, the air-conditioning remote controller 110 executes steps S208 to S212 in the same manner as in the case of FIG. 13.

As described above, the air-conditioning remote controller 110 hides image data G if the amount of information to be displayed on a settings management screen is greater than or equal to a threshold. This helps prevent deterioration of the visibility of information displayed on the settings management screen. That is, if the amount of information to be displayed on the settings management screen is greater than or equal to a predetermined value, the air-conditioning remote controller 110 hides image data G to give priority to the legibility of information displayed on the settings management screen. This leads to enhanced usability.

Modifications

Figure 19:
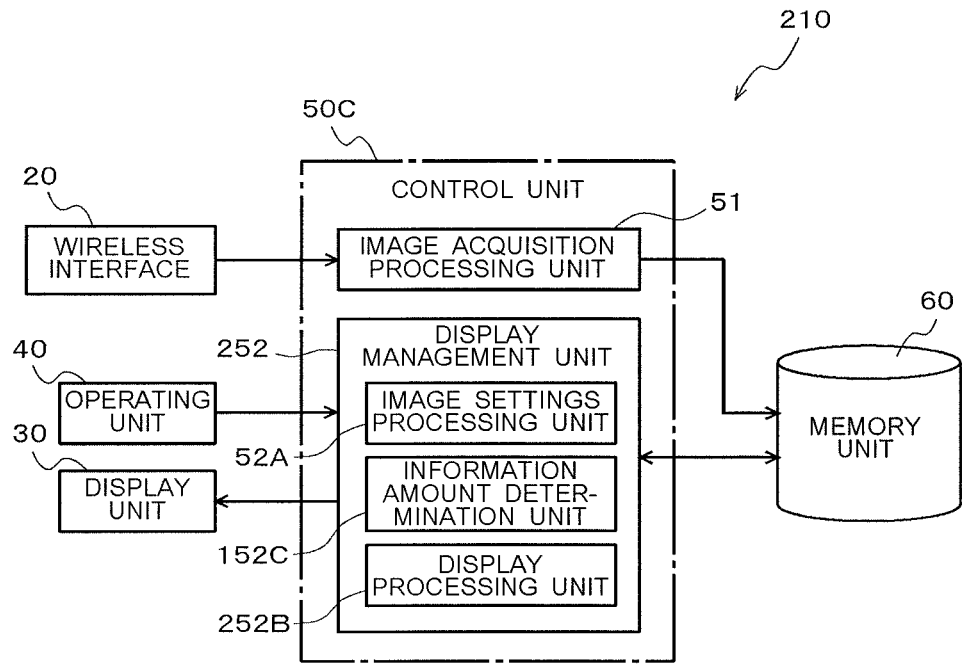
FIG. 19 is a block diagram illustrating the functional configuration of an air-conditioning remote controller according to a modification of Embodiment 3 of the present invention.
Figure 20:
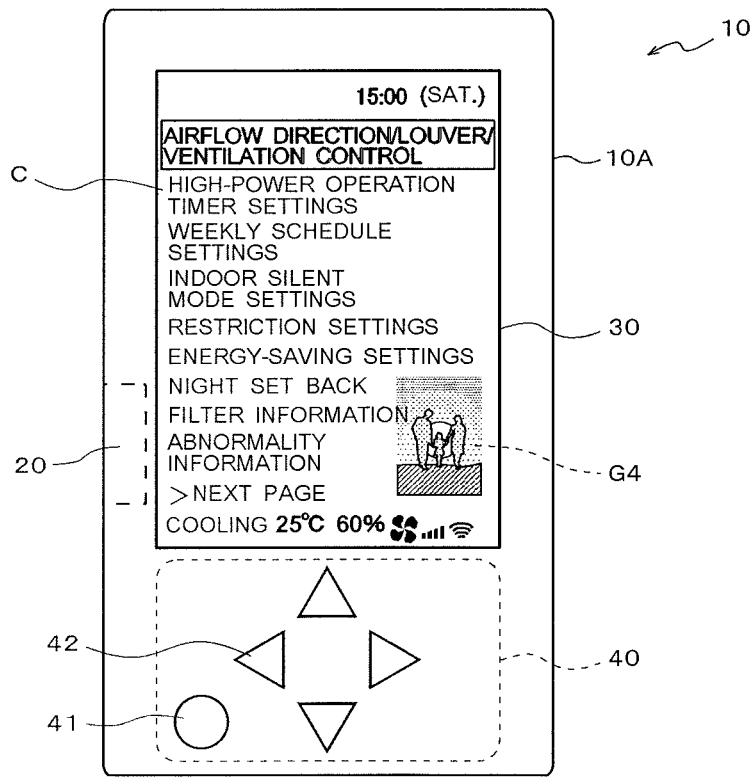
FIG. 20 illustrates a state in which image data is displayed in a reduced size on a portion of the display unit of the air-conditioning remote controller illustrated in FIG. 19.
Figure 21:
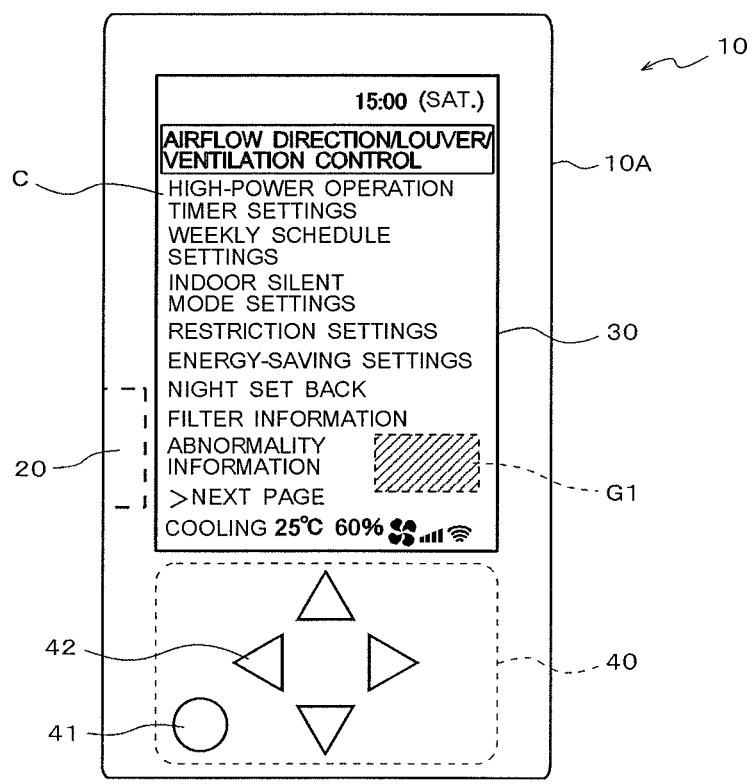
FIG. 21 illustrates a state in which image data is displayed on a portion of the display unit of the air-conditioning remote controller illustrated in FIG. 19.

FIG. 19 is a block diagram illustrating the functional configuration of an air-conditioning remote controller according to a modification of Embodiment 3 of the present invention. FIG. 20 illustrates a state in which image data is displayed in a reduced size on a portion of the display unit of the air-conditioning remote controller illustrated in FIG. 19. FIG. 21 illustrates a state in which image data is displayed on a portion of the display unit of the air-conditioning remote controller illustrated in FIG. 19. The air-conditioning remote controller 110 mentioned above hides image data G if the amount of information to be displayed on a settings management screen is greater than or equal to a threshold. By contrast, a characteristic feature of an air-conditioning remote controller 210 according to this modification is that if the amount of information to be displayed on a settings management screen is greater than or equal to a threshold, the air-conditioning remote controller 210 displays image data G in an area that does not obstruct the display of information on the settings management screen, such as by reducing or moving the image data G. In the following, features identical or similar to those of the air-conditioning remote controller 110 will be designated by the same reference signs and will not be described in further detail.

As illustrated in FIG. 19, the air-conditioning remote controller 210 includes a control unit 50C. The control unit 50C includes the image acquisition processing unit 51, and a display management unit 252. The display management unit 252 includes the image settings processing unit 52A, the information amount determination unit 152C, and a display processing unit 252B.

Upon receiving an output of a display change command from the information amount determination unit 152C, the display processing unit 252B acquires, from the memory unit 60, information to be displayed on the post-transition settings management screen, and identifies a blank area where no information is displayed. Further, based on the shape or other features of the blank area, the display processing unit 252B selects a display area that does not obstruct the display of information on the settings management screen.

If image data G associated with the post-transition settings management screen is set as full-display image data, the display processing unit 252B reduces the display size of the image data G, and displays the reduced image data G in a display area on the screen of the display unit 30. In this case, the display processing unit 252B may select, from within the blank area, a display area that allows the reduction ratio of the image data G to be minimized. If the blank area contains a plurality of similar-sized areas capable of displaying the image data G, the display processing unit 252B may preferentially select an area located in the lower part of the display unit 30.

For instance, even if the settings management screen C is associated with the image data G4 set as full-display image data as illustrated in FIG. 9, when a transition is made to the settings management screen C, unlike the case illustrated in FIG. 11(a), the display processing unit 252B reduces the image data G4 and displays the reduced image data G4 in a display area located at the lower right of the display unit 30 as illustrated in FIG. 20. Although FIG. 20 illustrates a case in which a display area is selected from within a blank area, an area slightly extending off the blank area may be selected as such a display area.

If image data G associated with the post-transition settings management screen is set as partial-display image data, the display processing unit 252B moves the image data G to a display area in which to display the image data G. For instance, even if the settings management screen C is associated with the image data G1 that is set to be displayed as partial-display image data at the lower center position, when a transition is made to the settings management screen C, the display processing unit 252B displays the image data G1 at the lower right position as illustrated in FIG. 21. Although FIG. 21 illustrates a case in which the display processing unit 252B displays image data G without changing its size, this should not be construed restrictively. Alternatively, the display processing unit 252B may reduce or enlarge the image data G in accordance with the size of a blank area, and move the reduced or enlarged image data G to another area for display. In this regard, however, if displaying the image data G as per the settings does not hinder the visibility of information displayed on the settings management screen, the display processing unit 252B may display the image data G without moving the image data G. Otherwise, the display processing unit 252B is similar in configuration to the display processing unit 152B described above.

Figure 22:
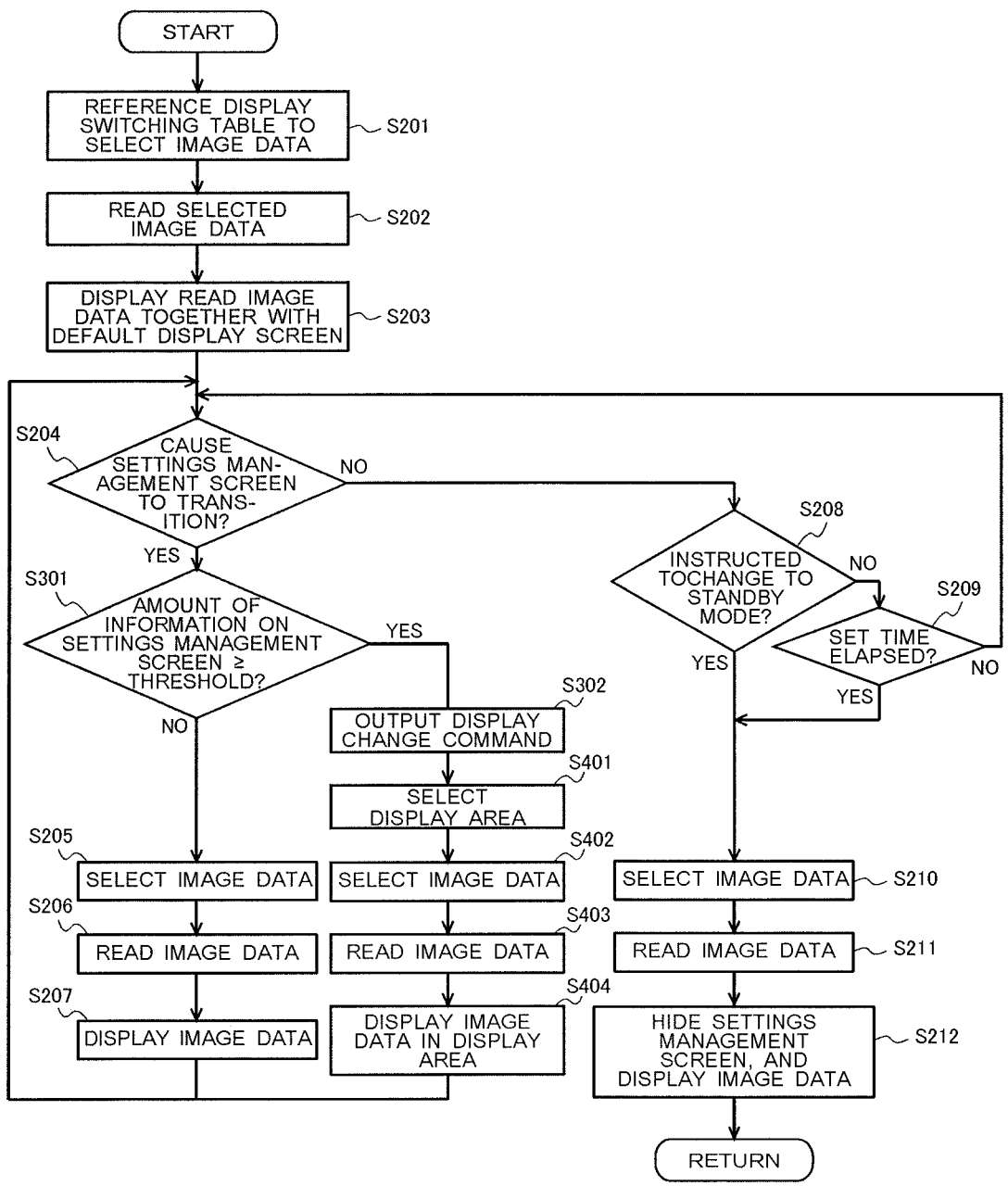
FIG. 22 is a flowchart illustrating how the control unit illustrated in FIG. 20 operates when displaying image data.

FIG. 22 is a flowchart illustrating how the control unit 50C illustrated in FIG. 20 operates when displaying image data G. With reference to FIG. 22, the following describes operation related to an acquisition process and a setting process for image data G that are performed by the control unit 50C. The following description is directed to a case in which the standby mode and each settings management screen are associated with the corresponding image data. In FIG. 22, steps similar to those in FIGS. 13 and 18 will be designated by the same reference signs and will not be described in further detail.

First, the air-conditioning remote controller 210 executes steps S201 to S203. Then, in response to a user operation that causes a transition of the current settings management screen (step S204/Yes), the information amount determination unit 152C acquires, from the memory unit 60, information to be displayed on the post-transition settings management screen, and determines whether the amount of information to be displayed is greater than or equal to a threshold (step S301). If the information amount determination unit 152C determines that the amount of information to be displayed is greater than or equal to the threshold (step S301/Yes), the information amount determination unit 152C transmits a display change command to the display processing unit 252B (step S302).

Upon receiving an output of the display change command from the information amount determination unit 152C, the display processing unit 252B acquires, from the memory unit 60, information to be displayed on the post-transition settings management screen, and identifies a blank area where no information is displayed. Then, based on the shape or other features of the blank area, the display processing unit 252B selects a display area in which to display image data G (step S401).

The display processing unit 252B selects image data G corresponding to the post-transition settings management screen (step S402), and reads the selected image data G from the memory unit 60 (step S403). Then, at the time of transition of the current settings management screen, the display processing unit 252B displays the image data G in the display area (step S404), and the process returns to step S204.

If the information amount determination unit 152C determines that the amount of information to be displayed is less than the threshold (step S301/No), the display processing unit 252B executes steps S205 to S207 as in the case of FIG. 13, and the process returns to step S204. Further, the air-conditioning remote controller 210 executes steps S208 to S212 as in the case of FIG. 13.

As described above, with the air-conditioning remote controller 210 according to this modification, if the amount of information to be displayed on a settings management screen is greater than or equal to a threshold, the display state of image data G is changed such that the image data G is displayed in a manner that does not obstruct the display of information on the settings management screen. This helps prevent deterioration of the visibility of information displayed on the settings management screen. That is, if the amount of information to be displayed on the settings management screen is greater than or equal to a predetermined value, the air-conditioning remote controller 210 changes the display state of the image data G as appropriate with priority given to the legibility of information displayed on the settings management screen. This leads to enhanced usability.

Although the foregoing description of the modification is directed to the case in which image data G associated with each settings management screen in advance is displayed in a manner that reduces, moves, or otherwise changes the image data G, this should not be construed restrictively. For example, dedicated image data G, dedicated for display either on a portion of or as the background of a settings management screen containing an amount of displayed information greater than or equal to a threshold, may be stored in the memory unit 60 in advance. Then, at the time of transition to a settings management screen that contains an amount of displayed information greater than or equal to a threshold, the air-conditioning remote controller 210 may display, on the display unit 30, such dedicated image data G that gives priority to the visibility of the settings management screen. The dedicated image data G may be able to be set by the user, or may be set in advance.

Although two cases have been described above with reference to Embodiment 3, that is, one in which image data G is hidden at the time of transition to a settings management screen that displays an amount of information greater than or equal to a threshold, and another in which image data G is displayed in a manner that reduces, moves, or otherwise changes the image data G at the time of such transition, this should not be construed restrictively. For example, the user may be able to make, via the operating unit 40, settings related to how to change the manner of display of the image data G. Then, at the time of transition to a settings management screen with an amount of displayed information greater than or equal to a threshold, the display state of the image data G may be changed in accordance with the settings made by the user.

Although the foregoing description of Embodiment 3 is directed to the case in which the information amount determination unit 152C uses a single threshold in performing a determination related to the amount of information to be displayed on a settings management screen, this should not be construed restrictively. Alternatively, the information amount determination unit 152C may use a plurality of thresholds in performing this determination process. That is, for example, a first threshold, which serves as a criterion for displaying image data G in such a way that reduces, moves, or other changes the image data G, and a second threshold, which serve as a criterion for hiding the image data G, may be stored in the memory unit 60 or other locations in advance. In this case, if the amount of information to be displayed on the settings management screen is greater than or equal to the first threshold and less than the second threshold, the image data G may be displayed in a manner that reduces, moves, or otherwise changes the image data G, and if the amount of information to be displayed is greater than or equal to the second threshold, the image data G may be hidden.

Each of the embodiments described above is illustrative of one preferred implementation of the air-conditioning remote controller, and not intended to limit the technical scope of the present invention to the particular forms disclosed. For example, although the foregoing description of the above embodiments is directed to the case in which the settings management screens A to C serve as a plurality of settings management screens, the number of types of settings management screens can be increased or decreased as desired. The memory unit 60 may store, as information of a settings management screen, for example, information of an administrator-only screen used exclusively by the administrator, or information of a servicing menu display screen used for servicing purposes. The display processing unit 52B, 152B, or 252B may, in response to a user's setting operation, display a photograph of the face of an administrator or another such person as the background of or on a portion of the administrator-only screen or another such screen. This enables a third person to recognize who is allowed to manage the screen, allowing for prompt troubleshooting.

Although each of the figures described above with reference to the embodiments illustrates the case in which grayscale image data is displayed on the display unit 30, this should not be construed restrictively. Alternatively, the display unit 30 may employ a full-color full-dot liquid crystal display. This enhances expressiveness of image, thus further enhancing, for example, user's comfort and advertising effect.

Each of the air-conditioning remote controllers 10, 110, and 210 may have an imaging unit equipped with a camera including an imaging device such as a CCD or CMOS imaging device. With this configuration, image data captured by the imaging unit and image data G acquired from the communication terminal 100 can be used in combination for display on the display unit 30 or to perform switching of image data G. This enables more flexible image selection.

In addition, although the foregoing description of the above-mentioned embodiments is directed to the case in which image data G is acquired by radio, this should not be construed restrictively. Alternatively, each of the air-conditioning remote controllers 10, 110, and 210 may, for example, acquire image data G from a physical medium such as a USB memory, or from a USB-connected wired device or other devices.

Further, the display unit 30 may be, for example, a touch panel including a display panel that displays characters, images, or other information, and a detection unit overlaid on the display panel to detect a touch operation. The air-conditioning remote controller 10, 110, or 210 may be configured to have, instead of the display unit 30 and the operating unit 40, a touch panel or some other device that combines the functions of the display unit 30 and the operating unit 40. For example, if the air-conditioning remote controller 10, 110, or 210 with a touch panel that combines the functions of the display unit 30 and the operating unit 40 uses features such as a frameless liquid crystal display, a frame visually integrated with wallpaper or other features in a room, or a wall-embedded design, this further enhances the sense of integration with the room or other places.

The air-conditioning remote controller 10, 110, or 210 may display, as image data G, information about conditions such as hot, comfortable, cold, abnormal, or fire, which would normally be expressed in words or in the form of error codes. The air-conditioning remote controller 10, 110, or 210 may capture images of various switches as image data G so that each piece of image data G functions as a switch. Such images of various switches may be created in the air-conditioning remote controller 10, 110, or 210 or may be created by an external device such as the communication terminal 100. Further, the air-conditioning remote controller 10, 110, or 210 may be configured to replace information to be displayed on the display unit 30, such as numbers or characters, with image data G as much as possible, and display such image data G to enable digital operation.

In addition, although FIG. 1 illustrates four operating keys 42, this should not be construed restrictively. Alternatively, the operating unit 40 may have three or less operating keys 42, or five or more operating keys 42. The shapes of the ON/OFF key 41 and operating keys 42 may be changed to any desired shapes as appropriate. Further, the placement of the ON/OFF key 41 and the operating keys 42 is not limited to that illustrated in FIG. 1 but may be changed as appropriate.

The invention claimed is:

1. An air-conditioning remote controller configured to operate an air-conditioning apparatus, the air-conditioning remote controller comprising:
   a display configured to display various information;
   a processor configured to
      acquire image data from an external communication terminal, and
      control the display to display a settings management screen relating to settings and management of the air-conditioning apparatus, and the image data acquired by the processor from the communication terminal,
      switch between modes, the modes including an air-conditioning management mode that controls the display to display the settings management screen, and a standby mode that controls the display to hide the settings management screen in accordance with a setting or a user operation, and cause, when switching to the standby mode, the display to display the image data associated with the standby mode; and a memory unit configured to store a display switching table, the display switching table associating a plurality of pieces of the image data with a plurality of the settings management screens, wherein the processor is further configured to
select, in response to a transition of the settings management screen, the image data corresponding to the settings management screen from the display switching table, and display the selected image data on the display, at a time of transition of the settings management screen, determine whether an amount of information to be displayed on the settings management screen after the transition is greater than or equal to a threshold, and hide the image data if it is determined by the processor that the amount of information to be displayed is greater than or equal to the threshold.

2. The air-conditioning remote controller of claim 1, wherein the processor is further configured to display the image data on an entirety of a screen of the display.

3. The air-conditioning remote controller of claim 2, wherein the processor is further configured to display the image data on the entirety of the screen of the display as a background of the settings management screen.

4. The air-conditioning remote controller of claim 1, wherein the processor is further configured to display the image data on a portion of a screen of the display.

5. The air-conditioning remote controller of claim 4, wherein the processor is further configured to display a plurality of pieces of the image data, each at a predetermined position on the screen of the display.

6. The air-conditioning remote controller of claim 2, wherein the processor is further configured to display, in a superimposed manner over the image data to be displayed on the entirety of the screen of the display, an other piece of the image data on a portion of the screen of the display.

7. The air-conditioning remote controller of claim 6, wherein the processor is further configured to, in a superimposed manner over the image data to be displayed on the entirety of the screen of the display, display a plurality of other pieces of the image data, each at a predetermined position on the screen of the display.

8. The air-conditioning remote controller of claim 1, wherein the processor is further configured to acquire the image data from the communication terminal via radio communication.

9. The air-conditioning remote controller of claim 1, wherein the processor is further configured to perform a replacement setting that replaces the image data associated with the settings management screen in the display switching table, with an other piece of image data stored in the memory unit.

10. An air-conditioning remote controller configured to operate an air-conditioning apparatus, the air-conditioning remote controller comprising:
a display configured to display various information;
a processor configured to
acquire image data from an external communication terminal, and
control the display to display a settings management screen relating to settings and management of the air-conditioning apparatus, and the image data acquired by the processor from the communication terminal,
switch between modes, the modes including an air-conditioning management mode that controls the display to display the settings management screen, and a standby mode that controls the display to hide the settings management screen in accordance with a setting or a user operation, and
cause, when switching to the standby mode, the display to display the image data associated with the standby mode; and
a memory unit configured to store a display switching table, the display switching table associating a plurality of pieces of the image data with a plurality of the settings management screens,
wherein the processor is further configured to
select, in response to a transition of the settings management screen, the image data corresponding to the settings management screen from the display switching table, and display the selected image data on the display,
at a time of transition of the settings management screen, determine whether an amount of information to be displayed on the settings management screen after the transition is greater than or equal to a threshold, and
display the image data in a reduced size if it is determined by the processor that the amount of information to be displayed is greater than or equal to the threshold.

11. The air-conditioning remote controller of claim 10, wherein the processor is further configured to display the image data on an entirety of a screen of the display.

12. The air-conditioning remote controller of claim 10, wherein the processor is further configured to display the image data on a portion of a screen of the display.

13. The air-conditioning remote controller of claim 10, wherein the processor is further configured to acquire the image data from the communication terminal via radio communication.

14. The air-conditioning remote controller of claim 10, wherein the processor is further configured to perform a replacement setting that replaces the image data associated with the settings management screen in the display switching table, with an other piece of image data stored in the memory unit.

15. An air-conditioning remote controller configured to operate an air-conditioning apparatus, the air-conditioning remote controller comprising:
a display configured to display various information;
a processor configured to
acquire image data from an external communication terminal, and
control the display to display a settings management screen relating to settings and management of the air-conditioning apparatus, and the image data acquired by the processor from the communication terminal,
switch between modes, the modes including an air-conditioning management mode that controls the display to display the settings management screen, and a standby mode that controls the display to hide the settings management screen in accordance with a setting or a user operation, and cause, when switching to the standby mode, the display to display the image data associated with the standby mode; and a memory unit configured to store a display switching table, the display switching table associating a plurality of pieces of the image data with a plurality of the settings management screens, wherein the processor is further configured to select, in response to a transition of the settings management screen, the image data corresponding to the settings management screen from the display switching table, and display the selected image data on the display, at a time of transition of the settings management screen, determine whether an amount of information to be displayed on the settings management screen after the transition is greater than or equal to a threshold, wherein the memory unit stores dedicated image data that gives priority to visibility of the settings management screen, and wherein the processor is further configured to display the dedicated image data on the display if it is determined by the processor that the amount of information to be displayed is greater than or equal to the threshold.

16. The air-conditioning remote controller of claim 15, wherein the processor is further configured to display the image data on an entirety of a screen of the display.

17. The air-conditioning remote controller of claim 15, wherein the processor is further configured to display the image data on a portion of a screen of the display.

18. The air-conditioning remote controller of claim 15, wherein the processor is further configured to acquire the image data from the communication terminal via radio communication.

19. The air-conditioning remote controller of claim 15, wherein the processor is further configured to perform a replacement setting that replaces the image data associated with the settings management screen in the display switching table, with an other piece of image data stored in the memory unit.

* * * * *